(12) United States Patent
Hwang et al.

(10) Patent No.: US 12,737,097 B2
(45) Date of Patent: Sep. 15, 2026

(54) ELECTRONIC APPARATUS AND CONTROL METHOD THEREOF

(71) Applicant: SAMSUNG ELECTRONICS CO., LTD., Suwon-si (KR)

(72) Inventors: Sungjun Hwang, Suwon-si (KR); Jiyeon Ma, Suwon-si (KR); Jingun Jung, Suwon-si (KR); Euijun Kim, Suwon-si (KR); Youngah Lee, Suwon-si (KR); Chad Philip Hall, Seattle, WA (US); Marine Au Yeung, Seattle, WA (US); Felix Yushin Chang, Seattle, WA (US); Carolyn Yuen Ming Yip, Seattle, WA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 18/387,268

(22) Filed: Nov. 6, 2023

(65) Prior Publication Data

US 2024/0069703 A1 Feb. 29, 2024

Related U.S. Application Data

(63) Continuation of application No. PCT/KR2023/003528, filed on Mar. 16, 2023.

(30) Foreign Application Priority Data

Apr. 6, 2022 (KR) ........................ 10-2022-0043058
May 27, 2022 (KR) ........................ 10-2022-0065432

(51) Int. Cl.
*G06F 3/04842* (2022.01)
*G06F 3/14* (2006.01)
(Continued)

(52) U.S. Cl.
CPC ............ *G06F 3/04842* (2013.01); *G06F 3/14* (2013.01); *G06V 10/25* (2022.01); *G06V 40/172* (2022.01); *G06V 2201/07* (2022.01)

(58) Field of Classification Search
CPC ....... G06F 3/04842; G06F 3/14; G06V 10/25; G06V 40/172
(Continued)

(56) References Cited

U.S. PATENT DOCUMENTS 8,472,665 B2 6/2013 Hildreth
9,400,562 B2 7/2016 Takazawa
(Continued)

FOREIGN PATENT DOCUMENTS

JP 5453246 B2 3/2014
JP 2014-138257 A 7/2014
(Continued)

OTHER PUBLICATIONS

International Search Report (PCT/ISA/210) issued by the International Searching Authority on Jun. 27, 2023 in International Application No. PCT/KR2023/003528.
(Continued)

*Primary Examiner* — William D Titcomb
(74) *Attorney, Agent, or Firm* — Sughrue Mion, PLLC

(57) ABSTRACT

An electronic apparatus includes a display, a camera, a communication interface, a memory configured to store information, and a one or more processor configured to, based on the specific object being identified from an image obtained through the camera, identify a preset zone with respect to the identified specific object, based on a user being identified from the image obtained through the camera, identify whether the identified user is located within the preset zone, and based on a signal corresponding to a user interaction being received by the communication interface
(Continued)

while the user is located in the preset zone, control the display to display a user interface screen corresponding to a type of the user interaction.

20 Claims, 32 Drawing Sheets

(51) Int. Cl.
*G06V 10/25* (2022.01)
*G06V 40/16* (2022.01)

(58) Field of Classification Search
USPC .......................................................... 382/190
See application file for complete search history.

(56) References Cited

U.S. PATENT DOCUMENTS

| | | | | |
|---|---|---|---|---|
| 10,015,739 | B2 | 7/2018 | Yoon et al. | |
| 11,228,815 | B2 | 1/2022 | Lee | |
| 2008/0273755 | A1 | 11/2008 | Hildreth | |
| 2012/0054178 | A1 | 3/2012 | Tran et al. | |
| 2013/0024116 | A1 | 1/2013 | Kitatani | |
| 2014/0198030 | A1* | 7/2014 | Takazawa | G06V 10/145 345/156 |
| 2014/0310739 | A1* | 10/2014 | Ricci | G06F 16/951 725/75 |
| 2017/0046374 | A1* | 2/2017 | Fletcher | G06Q 10/20 |
| 2017/0069071 | A1 | 3/2017 | Jung | |
| 2019/0087646 | A1* | 3/2019 | Goulden | G06F 18/22 |
| 2019/0378476 | A1* | 12/2019 | Jeon | G06N 3/09 |
| 2020/0012901 | A1* | 1/2020 | Yu | G06F 18/2411 |
| 2020/0387709 | A1* | 12/2020 | Baykaner | G06F 3/04842 |
| 2021/0365232 | A1 | 11/2021 | Jin et al. | |
| 2022/0113395 | A1 | 4/2022 | Lee et al. | |
| 2022/0300753 | A1* | 9/2022 | Bapat | H04N 7/18 |
| 2023/0171467 | A1* | 6/2023 | Liu | G06F 3/0482 725/10 |
| 2025/0191452 | A1* | 6/2025 | Sedouram | G06F 3/04886 |

FOREIGN PATENT DOCUMENTS

| | | | |
|---|---|---|---|
| KR | 10-2012-0021245 | A | 3/2012 |
| KR | 10-2012-0052669 | A | 5/2012 |
| KR | 10-2013-0027643 | A | 3/2013 |
| KR | 10-2015-0046594 | A | 4/2015 |
| KR | 10-2015-0096075 | A | 8/2015 |
| KR | 10-2016-0060972 | A | 5/2016 |
| KR | 10-1940718 | B1 | 1/2019 |
| KR | 10-2019-0045501 | A | 5/2019 |
| KR | 10-2019-0102507 | A | 9/2019 |
| KR | 10-2192051 | B1 | 12/2020 |
| KR | 10-2021-0000974 | A | 1/2021 |
| KR | 10-2021-0003515 | A | 1/2021 |
| KR | 10-2021-0088400 | A | 7/2021 |

OTHER PUBLICATIONS

Written Opinion (PCT/ISA/237) issued by the International Searching Authority on Jun. 27, 2023 in International Application No. PCT/KR2023/003528.

Communication issued Apr. 9, 2025 by the European Patent Office in European Patent Application No. 23784878.3.

Communication issued on May 20, 2026 by the Korean Ministry of Intellectual Property in Korean Patent Application No. 10-2022-0065432.

* cited by examiner

ELECTRONIC APPARATUS AND CONTROL METHOD THEREOF

CROSS-REFERENCE TO RELATED APPLICATION(S)

This application is a bypass continuation of International Application No. PCT/KR2023/003528, filed on Mar. 16, 2023, which is based on and claims priority to Korean Patent Application No. 10-2022-0043058, filed Apr. 6, 2022, in the Korean Intellectual Property Office and Korean Patent Application No. 10-2022-0065432, filed May 27, 2022, in the Korean Intellectual Property Office, the disclosures of which are incorporated by reference herein in their entireties.

BACKGROUND

1. Field

This disclosure relates to an electronic apparatus and a control method thereof, and more particularly, to an electronic apparatus communicating with an external device and a control method thereof.

2. Description of the Related Art

An electronic apparatus such as a television (TV) has many functions due recent technological developments. In the case of an electronic apparatus providing an image through a display such as a TV, functions may include manipulating an electronic apparatus of a TV by sharing (or mirroring) through connection to an external device, or using a mobile device such as a smartphone.

In order to connect an electronic apparatus and an external device, a user input must be received through a user interface (UI) provided through an electronic apparatus or an external device; and in the case of the UI, a large number of depths may be required such that a user has an inconvenience to execute a function. In the case of a method of connecting based on a gesture of a user, a problem of misrecognition and/or malfunction may occur because an electronic apparatus and an external device are connected in a time and/or an area different from the user's intention.

SUMMARY

According to an aspect of the disclosure, an electronic apparatus includes: a display; a camera; a communication interface; a memory configured to store information; and a one or more processor configured to: based on a specific object being identified from an image obtained through the camera, identify a preset zone with respect to the specific object, based on a user being identified from the image, identify whether the user is located within the preset zone, and based on a signal corresponding to a user interaction being received by the communication interface and identifying that the user is located in the preset zone, control the display to display a user interface (UI) screen corresponding to a type of the user interaction.

The one or more processor may be further configured to: control the display to display an image including the specific object, control the display to display a UI screen to set a preset zone on the displayed image, and identify the preset zone based on a user command input through the UI screen.

The one or more processor may be further configured to, based on identifying that the user is located in the preset zone for a predetermined amount of time, identify that the user is located in the preset zone.

The one or more processor may be further configured to: control the display to display an image including a plurality of specific objects, control the display to display a UI screen to set preset zones corresponding to the plurality of specific objects from the displayed image, and identify the preset zones corresponding to the plurality of specific objects based on a user command input through the UI screen.

The one or more processor may be further configured to: control the display to display a UI screen representing a region based on each of the plurality of specific objects, and identify at least one region that is selected based on a user command, from among regions identified based on each of the plurality of specific objects, as the preset zone.

The one or more processor may be further configured to: store, in the memory, information about a plurality of preset zones mapped to face information of a plurality of users, based on the face information of a first user being identified from an image obtained through the camera, obtain information about a plurality of preset zones mapped to the face information of the first user among the face information of the plurality of users, and identify whether the first user is located in the plurality of preset zones mapped to the face information of the first user.

The one or more processor may be further configured to: identify a control command corresponding to a type of the user interaction, and based on the control command being a command to control a UI screen provided by a user terminal, transmit, to the user terminal through the communication interface, a control signal to provide a UI screen corresponding to content displayed on the display in the user terminal.

The one or more processor may be further configured to: identify whether a user terminal is located in the preset zone based on received signal strength indication (RSSI) size information of a signal that is received from the user terminal, and based on identifying that the user terminal is located in the preset zone, identify that the user is located within the preset zone.

The one or more processor may be further configured to: based on the specific object being identified from a first image obtained through the camera, identify a preset zone with respect to the specific object, and store, in the memory, information about the preset zone, and based on the user being identified from a second image obtained through the camera, identify whether the user is located within the preset zone based on information about the preset zone stored in the memory.

The UI screen corresponding to a type of the user interaction may be a UI screen for providing a multi device experience.

According to an aspect of the disclosure, a method for controlling an electronic apparatus, includes: based on a specific object being identified from an image obtained through a camera, identifying a preset zone with respect to the specific object; based on a user being identified from the image, identifying whether the user is located within the preset zone; and based on a signal corresponding to a user interaction being received by the electronic apparatus while the user is located in the preset zone, displaying a user interface (UI) screen corresponding to a type of the user interaction.

The identifying the preset zone may include: displaying an image including the specific object; displaying a UI screen to set a preset zone on the displayed image; and identifying the preset zone based on a user command input through the UI screen.

The identifying the preset zone may include, based on identifying that the user is located in the preset zone for a predetermined amount of time, identifying that the user is located in the preset zone.

The identifying the preset zone may include: displaying an image including a plurality of specific objects; displaying a UI screen to set preset zones corresponding to the plurality of specific objects from the displayed image; and identifying the preset zones corresponding to the plurality of specific objects based on a user command input through the UI screen.

The displaying the UI screen may include: displaying a UI screen representing a region based on each of the plurality of specific objects, and the identifying the preset zone corresponding to each of the plurality of specific objects includes identifying at least one region that is selected based on a user command, from among regions identified based on each of the plurality of specific objects, as the preset zone.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments of the disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be arbitrarily selected, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B," or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through an intervening third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

Figure 1:
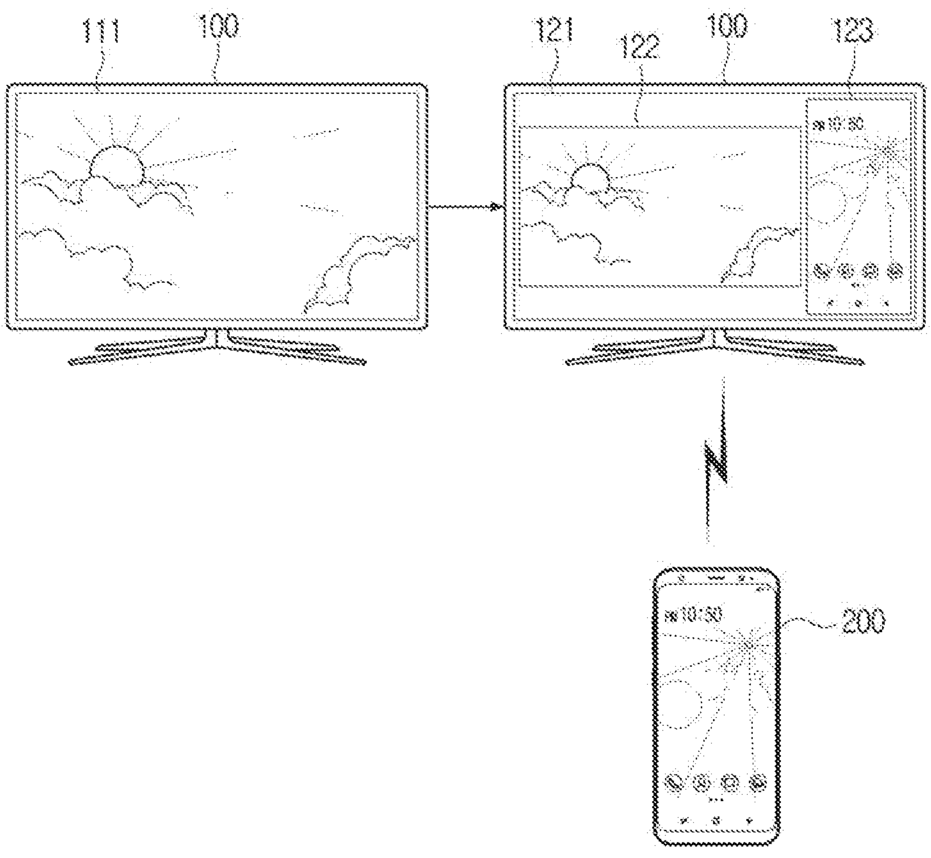
FIG. 1 is a diagram illustrating an operation method of an electronic apparatus, according to an embodiment of the disclosure.

FIG. 1 is a diagram illustrating an operation method of an electronic apparatus, according to an embodiment of the disclosure.

According to an embodiment, the electronic apparatus 100 includes a TV, a personal computer (PC), a laptop computer, a smartphone, a tablet PC, a mobile medical device, a wearable device, an electronic blackboard (Interactive whiteboard), electronic picture frames, kiosks, virtual reality (VR) device, drone, and the like. In particular, the electronic apparatus 100 may be implemented with a camera.

According to an embodiment, the electronic apparatus 100 may perform a function corresponding to a user command received from the user terminal 200. Here, the user terminal 200 may be implemented in various types of electronic apparatuses that receive user commands for controlling the electronic apparatus 100 such as a smartphone, a tablet PC, a mobile medical device, a wearable device, an interactive whiteboard, a kiosk, and a game console. According to an embodiment, a touch screen may be provided together with a touch panel to receive a user's touch input.

According to an embodiment, the electronic apparatus 100 may perform a multi device experience (MDE) function based on a user command received from the user terminal 200. The MDE refers to a series of processes that provide various experiences to a user by applying Internet of Things (IoT) or artificial intelligence (AI) services to a plurality of electronic apparatuses of various types.

According to an embodiment, the electronic apparatus 100 may perform a function of mirroring an image displayed on the user terminal 200 to the electronic apparatus 100. For example, when the electronic apparatus 100 receives a user command for performing a mirroring function from the user terminal 200, the electronic apparatus 100 may provide an image 122 and an image 123 received from the user terminal 200, that is, the UI screen 121 including all images displayed on the user terminal 200.

However, when a user interaction is used in a process of connecting the electronic apparatus 100 and the user terminal 200, a user interaction is detected and a function corresponding to the user interaction is executed, thereby causing misrecognition and malfunction.

Accordingly, in the following, various embodiments of performing communication connection only when, based on the captured image, a user interaction is received while the user exists in a preset zone is identified, that is, when a user interaction with the intention of a communication connection is received will be described.

Figure 2:
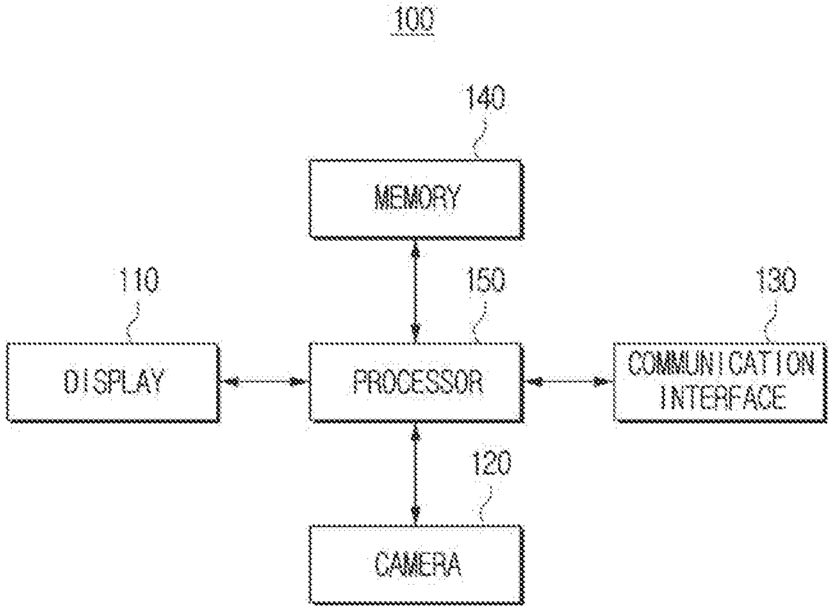
FIG. 2 is a block diagram illustrating a configuration of an electronic apparatus, according to an embodiment of the disclosure.

FIG. 2 is a block diagram illustrating a configuration of an electronic apparatus according to an embodiment of the disclosure.

Referring to FIG. 2, the electronic apparatus 100 may include a display 110, a camera 120, a communication interface 130, a memory 140, and a processor 150.

The display 110 may be implemented as a display including a self-emitting element or a display including a non-self-limiting element and a backlight. For example, the display 110 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 110, a backlight unit, a driving circuit which may be implemented as an a-si TFT, low temperature poly silicon (LTPS) TFT, organic TFT (OTFT), or the like, may be included as well. The display 140 may be implemented as a touch screen coupled to a touch sensor, a flexible display, a rollable display, a three-dimensional (3D) display, a display in which a plurality of display modules are physically connected, or the like. The display 110 may include a touch screen and may execute a program using fingers or a pen (e.g., a stylus pen).

The camera 120 may obtain an image by capturing an area within a certain field of view (FoV). The camera 120 may include a lens that focuses visible light and other optical signals reflected by an object and received by the image sensor, and an image sensor capable of detecting visible light and other optical signals. Here, the image sensor may include a 2D pixel array divided into a plurality of pixels.

The communication interface 130 may perform communication with a network device such as another user terminal.

According to an embodiment, the communication interface 130 may include a wireless communication module, for example, a Wi-Fi module, a Bluetooth module, or the like, but is not limited thereto, and the communication interface 130 may perform communication according to various communication standards such as Zigbee, 3rd generation (3G), 3rd generation partnership project (3GPP), long term evolution (LTE), LTE advanced (LTE-A), 4th generation (4G), 5th generation (5G), infrared data association (IrDA) technology, or the like, in addition to the communication methods as described above.

The memory 140 may store data that may be necessary for various embodiments. The memory 140 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100. The memory 140 embedded in the electronic apparatus 100 may be implemented as at least one of a volatile memory such as a dynamic random access memory (DRAM), a static random access memory (SRAM), a synchronous dynamic random access memory (SDRAM), or a non-volatile memory, such as one time programmable ROM (OTPROM), programmable ROM (PROM), erasable and programmable ROM (EPROM), electrically erasable and programmable ROM (EEPROM), mask ROM, flash ROM, a flash memory, such as NAND flash or NOR flash), a hard disk drive (HDD) or a solid state drive (SSD). In the case of a memory detachably mounted to the electronic apparatus 100, the memory may be implemented as a memory card, such as a compact flash (CF), secure digital (SD), micro secure digital (micro-SD), mini secure digital (mini-SD), extreme digital (xD), or multi-media card (MMC), and an external memory, such as a universal serial bus (USB) memory connectable to the USB port.

According to an embodiment, the information related to a preset zone may be stored in the memory 140. For example, information related to a specific object to identify the preset zone and information about a preset zone identified based on the specific object may be stored in the memory 140. According to another example, information about at least one preset zone mapped to each of face information of a plurality of users may be stored in the memory 140.

The one or more processor 150 (or, the processor) controls overall operations of the electronic apparatus 100. The processor 150 is electrically connected to the each configuration of the electronic apparatus 100 to control the overall operation of the electronic apparatus 100. The processor 150 may perform the operation of the electronic apparatus 100 according to various embodiments of the disclosure by executing at least one instruction stored in the memory 140.

According to an embodiment, the processor 150 may be connected to the display 110, camera 120, communication interface 130, and memory 140 for controlling the electronic apparatus 100.

According to an embodiment, the processor 150 may be called various names such as a digital signal processor (DSP), a microprocessor, a central processing unit (CPU), a micro controller unit (MCU), a micro processing unit (MPU), a controller, an application processor (AP), but herein the term processor 150 will be used.

The processor 150 may be implemented in a system on chip (SoC) type or a large scale integration (LSI) type in which a processing algorithm is built therein or in a field programmable gate array (FPGA) type. The processor 150 may include a volatile memory like SRAM.

Further, the processor 150 for executing the AI model according to an embodiment may be implemented through a combination of software and a general-purpose processor such as a central processor (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like. The processor 150 may control processing of the input data according to a predefined operating rule or AI model stored in the memory 140. If the processor 150 is an exclusive processor (or AI-only processor), the processor 150 may be designed with a hardware structure specialized for the processing of a particular AI model. For example, hardware specific to the processing of a particular AI model may be designed into a hardware chip, such as an application specific integrated circuit (ASIC), a field programmable gate array (FPGA), or the like. When the processor 150 is implemented with a dedicated processor, the processor 150 may be implemented to include a memory to implement an embodiment of the disclosure, or to include a memory processing function for using an external memory.

According to an embodiment, when a specific object is identified in an image obtained through the camera 120, the processor 150 may identify a preset zone based on the identified specific object. The specific object may be, for example, a table, a sofa, a chair, or the like, but is not limited thereto, and the specific object may be implemented as an object in a space where the user watches TV, or the like.

A preset zone refers to an area including a specific object identified in an image obtained through the camera 120. For example, when a specific object, for example, a sofa is identified in an image, the processor 150 may identify a pixel region corresponding to the sofa as a preset zone, or identify a region including a pixel region corresponding to the sofa or a margin pixel region other than the corresponding pixel region. A preset zone may be changed according to a user input, and a specific method for identifying a preset zone will be described in detail with reference to FIGS. 3A to 3D below.

FIGS. 3A to 3D are diagrams illustrating a preset zone according to an embodiment of the disclosure.

Figure 3A:
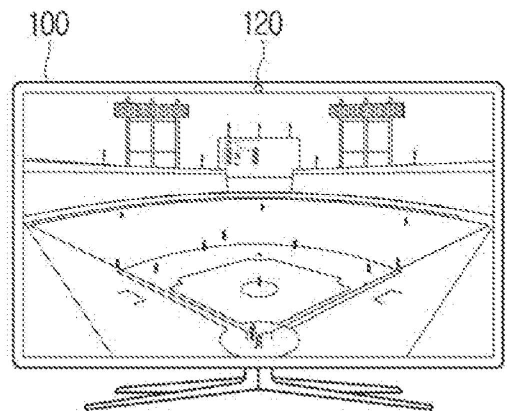
FIGS. 3A to 3D are diagrams illustrating a preset zone, according to an embodiment of the disclosure.
Figure 3A:
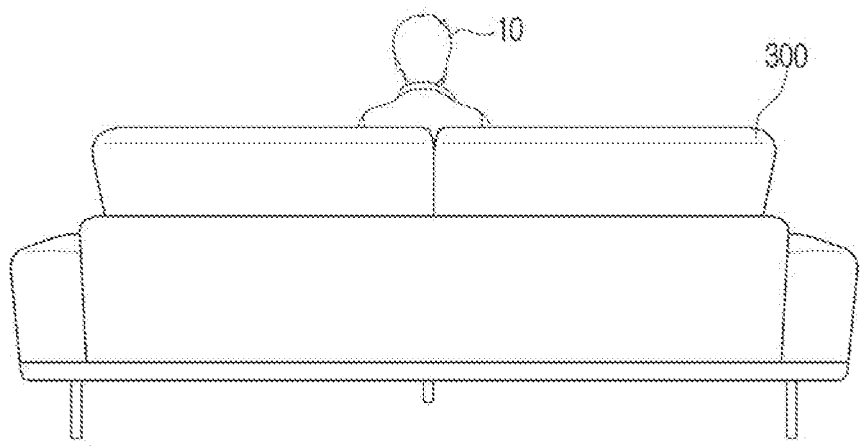
Figure 3B:
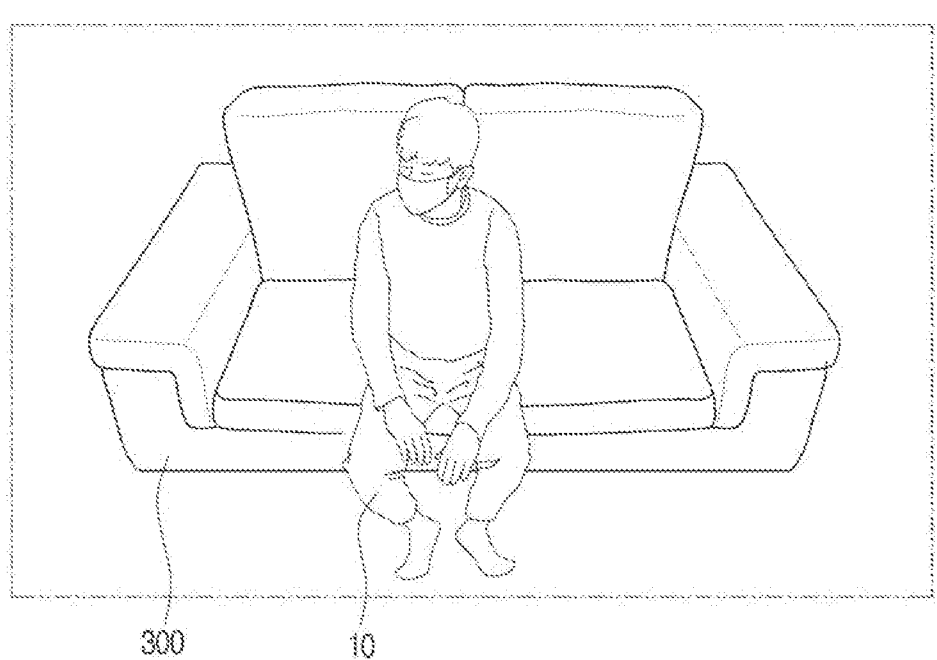

According to FIGS. 3A and 3B, according to an embodiment, the processor 150 may obtain an image corresponding to a viewing space through the camera 120. Image information on the user 10, the object 300, and the surrounding environment of the user 10 may be included in an image corresponding to the viewing space, and an image corresponding to the viewing space may be obtained in real time. According to one example, as shown in FIG. 3A, when the user 10 sits on the sofa 300 positioned on the front surface of the electronic apparatus 100, a captured image as illustrated in FIG. 3B may be obtained.

Figure 3C:
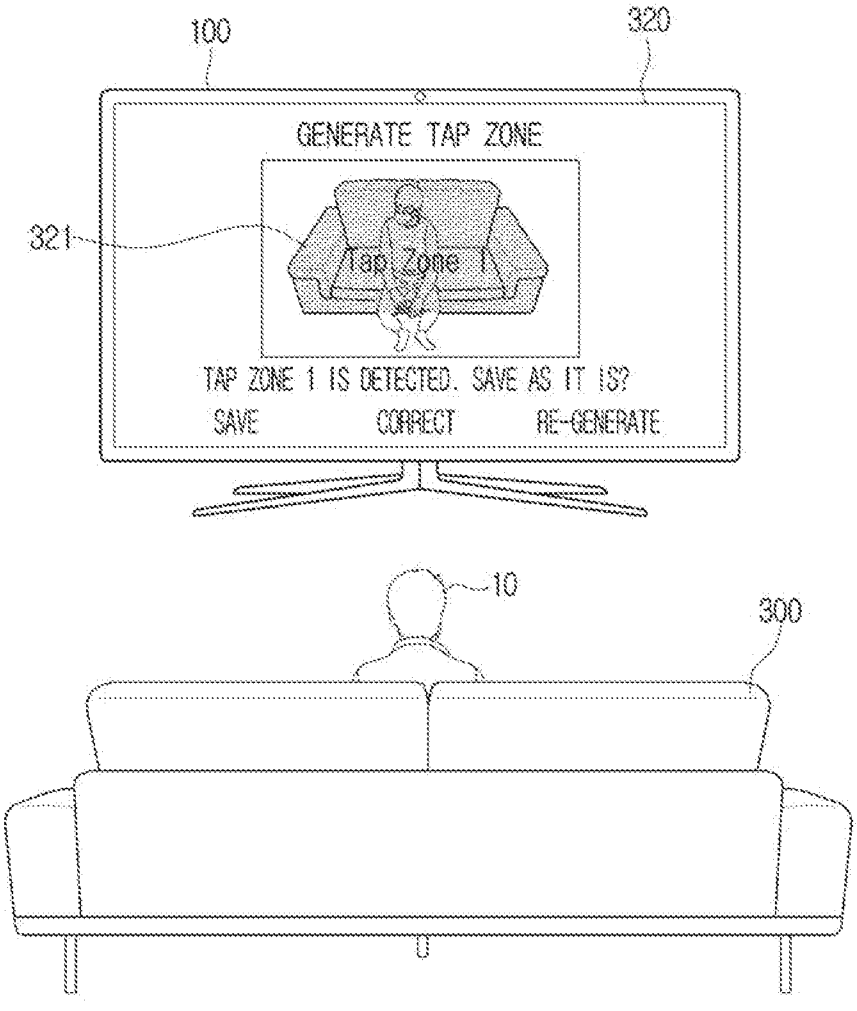

According to an embodiment, when it is identified that a specific object, for example, the sofa 300 is included in a captured image obtained through the camera 120, the processor 150 may control the display 110 to display an image including a specific object as illustrated in FIG. 3C and display a UI screen 320 for setting a preset zone in the displayed image. According to an embodiment, the processor 150 may analyze a pixel value included in the captured image to identify whether a specific object is included in the captured image. According to another example, the processor 150 may input a captured image to a trained neural network model to identify whether a specific object is included in the captured image. For example, in order to identify a specific object, a deep learning method such as object labelling may be used. The object labelling refers to receiving image information, classifying and localizing an object or region included in the image information, and labelling the object or region. For example, a neural network model may be trained by labelling each of a learning image including a sofa and a learning image that does not include a sofa.

Referring to FIG. 3C, according to an embodiment, when it is identified that the sofa 300, which is a specific object, is included in an image obtained through the camera 120, the processor 150 may control the display 110 to display an image including the sofa 300, which is a specific object, and a UI screen 320 for setting a preset zone. In this example, the processor 150 may display a pixel region 321 corresponding to the sofa 300 in an image separately from the other region.

According to an embodiment, the processor 150 may identify a preset zone based on a user command input through the electronic apparatus. According to an embodiment, it may be assumed that the region 321 corresponding to the sofa 300 in an image is identified. When a user command for changing at least one of a size or a position of a preset zone is input through the UI screen 320 displayed on the display 110, the processor 150 may identify an area corresponding to the user command as a preset zone. For example, when a user command for changing a horizontal size of a pixel region 321 corresponding to a sofa is input, the processor 150 may identify a pixel region corresponding to the size changed in the left and right direction as a preset zone.

Figure 3D:
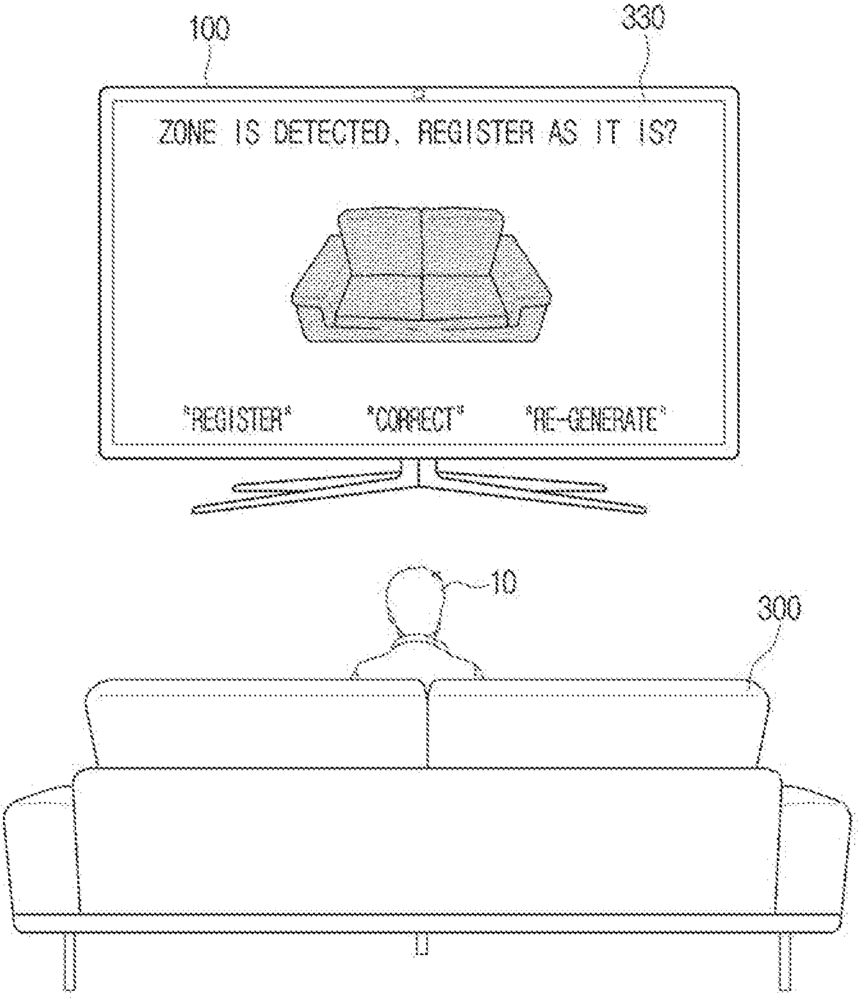

When a preset zone is identified, the processor 150 may control the display 110 to display a UI screen 330 for storing (or "registering"), changing (or "modifying"), or re-identifying (or "re-generating") information about the identified preset zone as shown in FIG. 3D. The information on the preset zone may be information on a pixel area of a preset zone in an image obtained through the camera 120. A preset zone may be identified based on received signal strength indication (RSSI) size information of the user terminal 200, which will be described in detail with reference to FIGS. 7 and 8.

According to an embodiment, when a user command corresponding to "registering" is input, the processor 150 may store information on the identified preset zone in the memory 140. According to another example, when a user command corresponding to "modify" is input, the processor 150 may control the display 110 to display the UI screen shown in FIG. 3C again. According to another example, when a user command corresponding to "generating again" is input, the processor 150 may re-obtain an image corresponding to the viewing space through the camera 120 to identify a specific object in the image.

Referring to FIG. 2, according to an embodiment, when a user is identified in an image obtained through the camera 120, the processor 150 may identify whether the identified user is located within a preset zone. According to an embodiment, the processor 150 may identify whether the user is located within a preset zone based on information on a preset zone pre-stored in the memory 140 and information on the location of the user. This will be described in detail with reference to FIGS. 6A and 6B.

According to an embodiment, when a signal corresponding to a user interaction inputted to the user terminal 200 is received through the communication interface 130 while the user is located within a preset zone, the processor 150 may control the display 110 to display a UI screen corresponding to the type of the user interaction. Here, the type, model, and function of the user terminal 200 as well as the type of the user interaction may be considered, but for convenience of description, the type of the user terminal 200 is assumed to be fixed.

The user interaction type may include, for example, at least one of an interaction of tapping on the user terminal 200 or a shake interaction of shaking the user terminal 200. However, embodiments are not limited thereto, and various user interactions may be included therein according to the type of the user terminal 200 such as flick, rolling, folding, and the like. The signal corresponding to the user interaction may be a signal for identifying the type of the user interaction by the electronic apparatus 100, but is not limited thereto, and may be a control command corresponding to the type of the user interaction. In the former case, the processor 150 may identify a corresponding control command based on the user interaction type.

In this case, the UI screen corresponding to the type of the user interaction may be a UI screen providing multi device experience (MDE). The MDE refers to a series of processes of providing various experiences to a user by applying IoT or AI services to a plurality of electronic apparatuses of various types. This will be described in detail with reference to FIG. 9.

According to an embodiment, when a signal corresponding to a user interaction inputted to the user terminal 200 is received while the processor 150 is located within a preset zone, the processor 150 may identify a control command corresponding to the type of the user interaction. For example, when the identified control command is a command for controlling a UI screen provided by the user terminal 200, the processor 150 may transmit a control signal for providing a corresponding UI screen of the context information of the electronic apparatus 100 to the user terminal 200 through the communication interface 130. Here, the context information of the electronic apparatus 100 is information on content displayed in the electronic apparatus 100, and may include, for example, a type of content, a content provider, whether to provide a subtitle of content, and the like. For example, the processor 150 may transmit, to the user terminal 200 through the communication interface 130, a control signal for providing, by the user terminal 200, a UI screen corresponding to content (for example, the type of content) displayed on the display 110.

According to an embodiment, it may be assumed that a signal corresponding to a shake interaction is received from the user terminal 200 through the communication interface 130 while an image is displayed through the display 110. When a control command corresponding to the shake interaction is a command for controlling a UI screen provided by the user terminal 200 instead of the electronic apparatus 100, the processor 150 may transmit the control signal described above to the user terminal 200 through the communication interface 130 so that a UI screen corresponding to the content displayed on the display 110 is provided by the user terminal 200. This will be described in detail with reference to FIGS. 10A to 10B.

According to an embodiment, the processor 150 may, if a plurality of specific objects are identified in the obtained image through a camera, identify a preset zone with respect to the plurality of identified specific objects. When the plurality of specific objects are identified, a specific method of identifying a preset zone will be described in greater detail with reference to FIGS. 4A to 4C.

According to an embodiment, the processor 150 may identify whether the user terminal 200 is located within the preset zone based on received signal strength indication (RSSI) size information of a signal periodically received from the user terminal 200. Here, as to RSSI size information, when a Bluetooth low energy (BLE) broadcasting signal periodically emitted from the electronic apparatus 100 is transmitted to the user terminal 200, the user terminal 200 identifies the size of the transmitted BLE broadcasting signal, and the electronic apparatus 100 receives signal size information corresponding thereto from the user terminal 200.

According to an embodiment, the processor 150 may store received signal strength indication (RSSI) size information (or standard size information, threshold size information) to identify a preset zone in the memory 140 based on a signal received from the user terminal 200.

The processor 150 may identify received signal strength indication (RSSI) size information of a signal periodically received from the user terminal 200, and when it is identified that the identified size information is less than or equal to the reference size, identify that the user terminal 200 is located within a preset zone. According to another example, when it is identified that the identified size information is greater than a reference size, it may be identified that the user terminal 200 is located outside a preset zone. When it is identified that the user terminal 200 is located within a preset zone, the processor 150 may identify that the user 10 is located within a preset zone. This will be described in detail with reference to FIGS. 7 to 8.

The processor 150 may not only identify whether the user is located within a preset zone based on the image obtained through the camera 120, but also may identify whether the user is located within a preset zone based on RSSI size information received from the user terminal 200 as described above. For example, when the function of the camera 120 is turned off by the user, the processor 150 may identify whether the user is located within a preset zone based on the RSSI size information.

According to another example, the processor 150 may identify whether the user is located within a preset zone by using the RSSI size information together with the image obtained through the camera 120. For example, even when it is identified that the user is located within a preset zone based on an image obtained through the camera 120, if it is identified that the user is not located within the preset zone based on the received RSSI size information, it may be identified that the user is not located within the preset zone. According to another example, when it is identified that the user is located within a preset zone based on the received RSSI size information, the processor 150 may, if it is identified that the user is not located within the preset zone based on the image obtained through the camera 120, identify that the user is not located within the preset zone based on the image obtained through the camera 120.

Figure 4A:
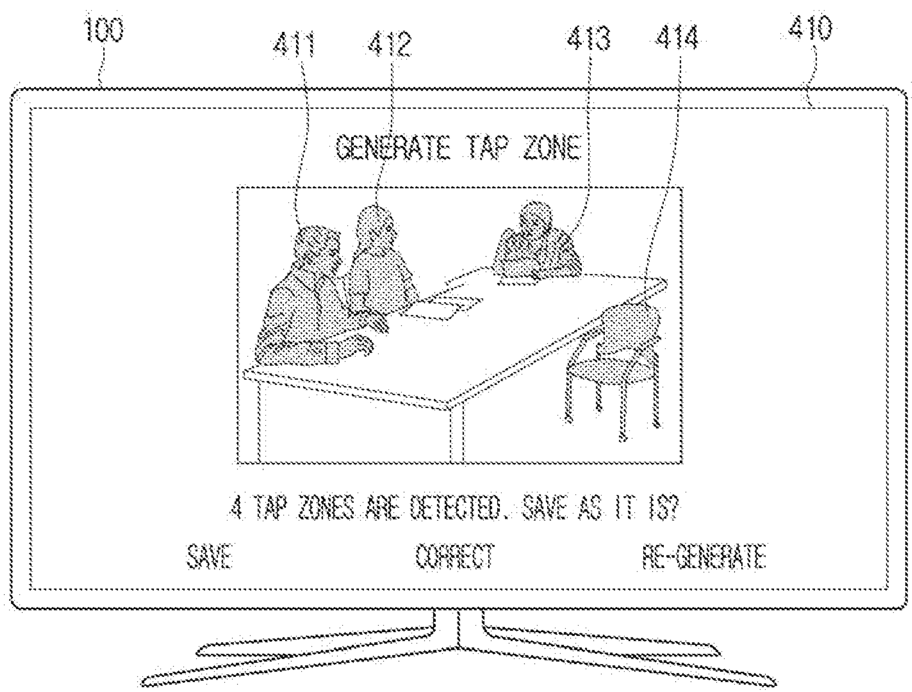
FIGS. 4A to 4C are diagrams illustrating at least one preset zone, according to an embodiment of the disclosure.
Figure 4B:
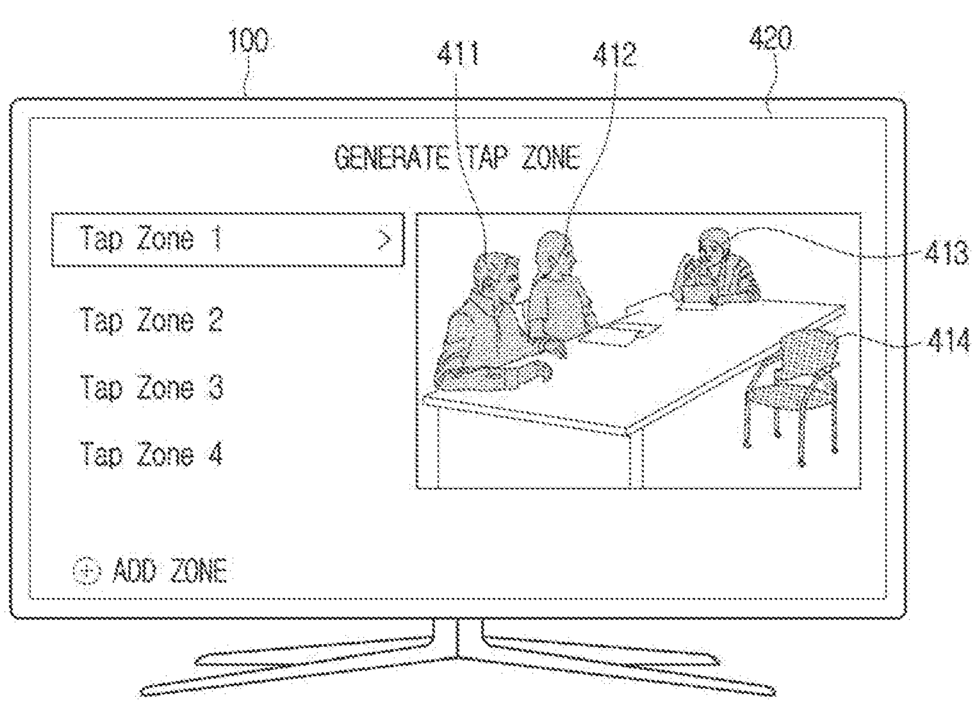
Figure 4C:
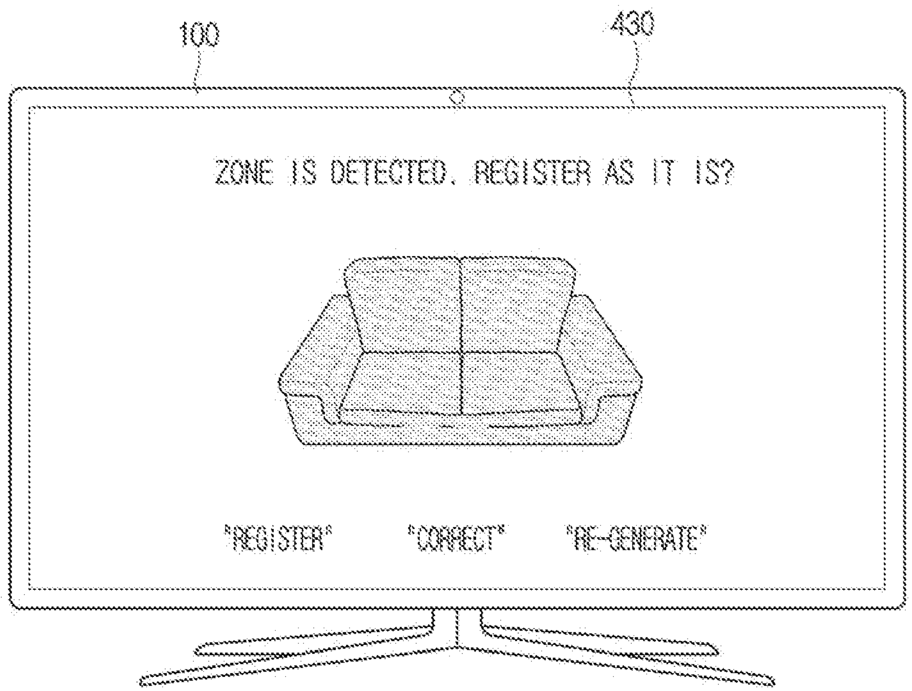

FIGS. 4A to 4C are diagrams illustrating at least one preset zone according to an embodiment of the disclosure.

According to FIG. 4A, when a plurality of specific objects 411 to 414 are identified, the processor 150 may control the display to display an image including a plurality of specific objects 411 to 414, and control the display 110 to display a UI screen 410 for setting a preset zone corresponding to each of a plurality of specific objects 411 to 414 in the displayed image. In this case, a deep learning method such as object labelling may be used to identify a specific object in the obtained image.

According to an embodiment, the processor 150 may identify a preset zone corresponding to each of the plurality of specific objects 411 to 414 based on the user command input through the displayed UI screen 420. For example, when four pixel regions corresponding to each of a plurality of specific objects 411 to 414 are identified, the processor 150 may identify four pixel regions as a preset zone. The processor 150 may identify all areas where the user is likely to be located as a preset zone. According to an embodiment, according to FIG. 4B, the processor 150 may identify, as a preset zone, at least one area selected based on a user command from among areas identified based on each of the plurality of specific objects 411 to 414. For example, when the user selects only the rightmost chair 414 among the plurality of specific objects 411 to 414, the processor 150 may identify a pixel region corresponding to the rightmost chair 414 among the pixel regions corresponding to the identified plurality of specific objects 411 to 414 as a preset zone. In this case, when a user command for changing the size or position of a preset zone is inputted through the displayed UI screen 320, the processor 150 may identify a pixel area corresponding to the user command as a preset zone.

The processor 150 may map identification information corresponding to a plurality of pixel regions and control the display 110 to provide a UI screen corresponding thereto. For example, when a plurality of specific objects 411 to 414 are identified, the processor 150 may map four pixel areas corresponding to each of a plurality of specific objects 411 to 414 from the right to "Tap zone 1", "Tap zone 2", "Tap zone 3" and "Tap zone 4", respectively, to provide a UI screen corresponding thereto. Accordingly, a user may conveniently select a pixel region.

According to FIG. 4C, when a preset zone is identified, the processor 150 may control the display 110 to display a UI screen 430 for storing (or "registering"), changing (or "modifying"), or re-identifying (or "re-generating") information about the identified preset zone.

In addition, according to an embodiment, when a plurality of preset zones are identified, the processor 150 may identify a type of a plurality of preset zones based on a user input, and identify a control command to provide different functions according to each of the plurality of zones based on a type of a preset zone and a user input.

According to an embodiment, when a user input for identifying each of a plurality of preset zones as a main zone and a sub zone is inputted, the processor 150 may identify each of a plurality of preset zones as a main zone or a sub zone based on the user input. Here, the main zone is a zone corresponding to a space where a user is mainly located, and the sub zone refers to a zone other than the main zone.

The processor 150 may receive a user input for identifying a function according to a user interaction of each sub zone network. For example, the processor 150 may receive a user input for providing a UI screen for executing a specific application in the case of sub zone 1, and providing a UI screen for executing an accessibility function (for example, a function activation function for turning on a caption) in case of sub zone 2.

When a user interaction is received, the processor 150 may perform a corresponding function based on a user input for identifying a function according to the identified type of the zone (e.g., main zone or sub zone) and user interaction of each sub zone. For example, as shown in FIG. 4C, it may be assumed that a plurality of tap zones are identified. In this case, the processor 150 may identify an operation corresponding to the interaction type for each of the plurality of preset zones based on the user input. When it is identified that the user is located within the tap zone 1 (object 414) identified as the main zone, the processor 150 may control the display 110 to provide a UI screen for mirroring the user terminal 200 when the tap interaction is received. Alternatively, when it is identified that the user is located within the tap zone 2 (object 413) identified as sub zone 1, the processor 150 may control the display 110 to provide a UI screen for executing a specific application when the tap interaction is received. Similarly, when it is identified that the user is located within tap zone 3 (object 412) that is sub zone 2, when the tap interaction is received, the display 110 may be controlled to provide a UI screen for executing an accessibility function (for example, a function to activate turning on a caption).

The processor 150 may provide a user with a UI screen for performing different functions for each of the plurality of preset zones when the same user interactions are received.

Referring back to FIG. 2, according to an embodiment, the processor 150 may identify a preset zone based on face information of a plurality of users, and may identify whether the user is located within a preset zone based on the identified zone. Here, the face information of the user is information on the distance between the facial features of the user and the geometric structure of the face, and when a user is included in the image obtained through the camera 120, the processor 150 may obtain face information of the user through an artificial intelligence (AI) module using the information as input information.

For example, the processor 150 may store information about a plurality of preset zones mapped to face information of a plurality of users in the memory 140. For example, based on face information of a first user being identified from an image obtained through the camera 120, information about a plurality of preset zones mapped to face information of the first user may be obtained among face information of the plurality of users, and whether the first user is located within the plurality of preset zones may be identified. When it is identified that there is no information on the mapped preset zone, the processor 150 may identify a preset zone of the first user through the process of FIGS. 4A to 4C, map information on the identified zone to the face information of the first user, and store the mapped information in the memory 140.

When face information of the first user is identified from the second image obtained through the camera 120, the processor 150 may obtain information on a plurality of preset zones mapped to the face information of the first user through the memory 140, and may identify whether the first user is located within a plurality of preset zones based on the information.

Figure 5A:
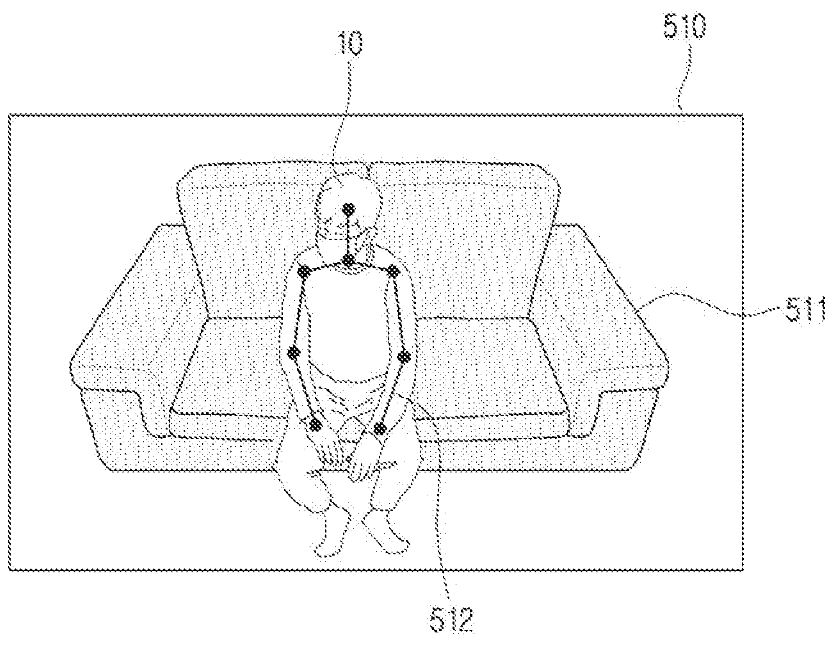
FIG. 5A is a diagram illustrating a method of identifying presence of a user, according to an embodiment of the disclosure.

FIG. 5A is a diagram illustrating a method of identifying presence of a user according to an embodiment.

According to FIG. 5A, according to an embodiment, the processor 150 may identify whether a specific object and a user are present based on an image obtained through the camera 120. According to an embodiment, the processor 150 may obtain a UI screen 510 with a pixel region 511 corresponding to a specific object and a skeleton 512 corresponding to the user 10 through an image obtained through the camera 120. The processor 150 may identify the presence of the user by identifying the body position of the user 10 based on the skeleton 512.

FIGS. 5B to 5E are diagrams illustrating a method of providing a user interface (UI) screen according to an embodiment of the disclosure.

According to an embodiment, the processor 150 may control the display 110 to provide UI screens 530 to 560 for providing an experiential tutorial to the user 10 when a signal corresponding to the user interaction is first received or a user input corresponding to execution of the experiential tutorial function is received after the information on the preset zone is stored.

Figure 5B:
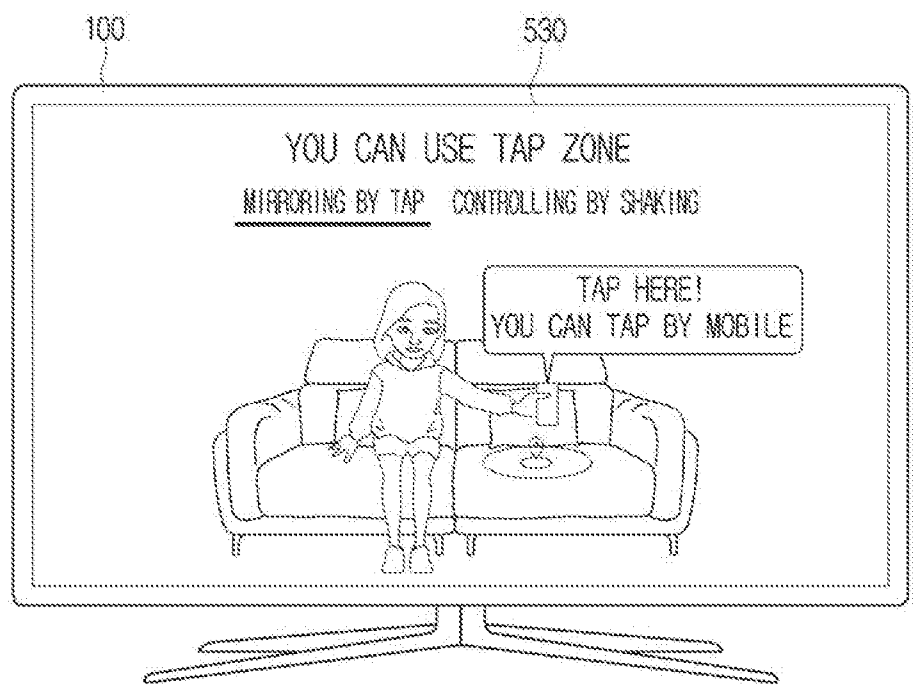
FIGS. 5B to 5E are diagrams illustrating a method of providing a user interface (UI) screen, according to an embodiment of the disclosure.
Figure 5C:
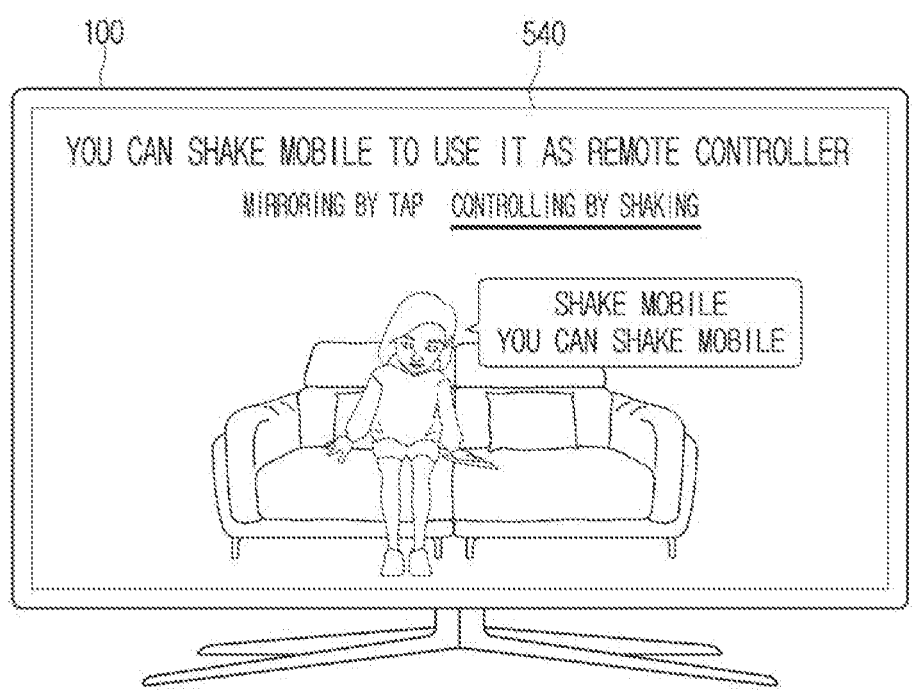

First, according to FIG. 5B, the processor 150 may control the display 110 to provide a UI screen 530 for guiding the user 10 to execute a tap input according to an embodiment. According to FIG. 5C, according to an embodiment, the processor 150 may control the display 110 to provide a UI screen 540 for guiding the user 10 to execute a shake input.

Figure 5D:
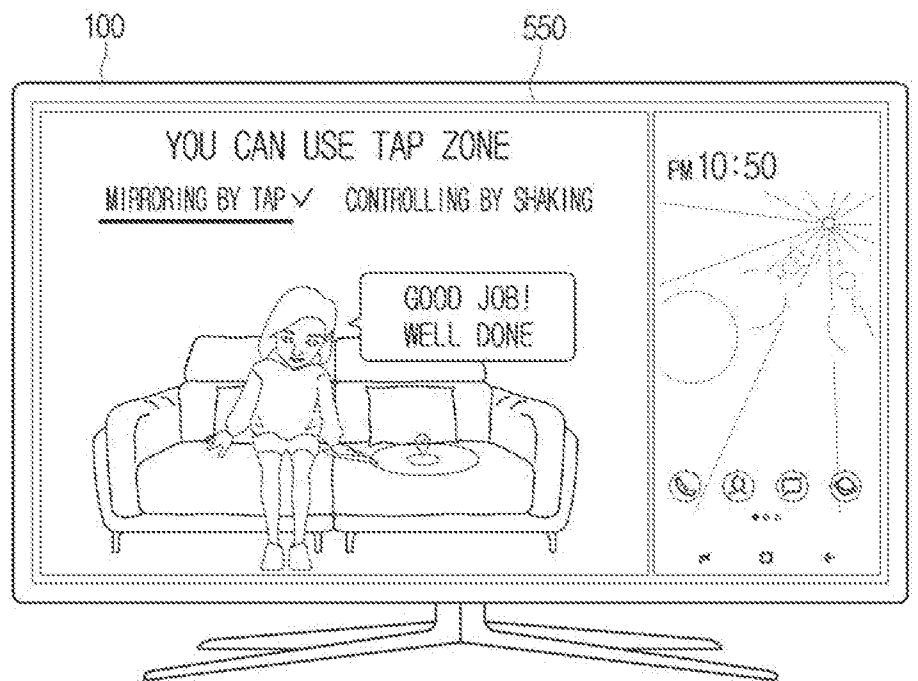

Referring to FIG. 5D, according to an embodiment, the processor 150 may control the display 110 to provide a UI screen 550 corresponding to a mirroring corresponding to a tap input as a signal corresponding to the tap input is received from the user terminal 200.

Figure 5E:
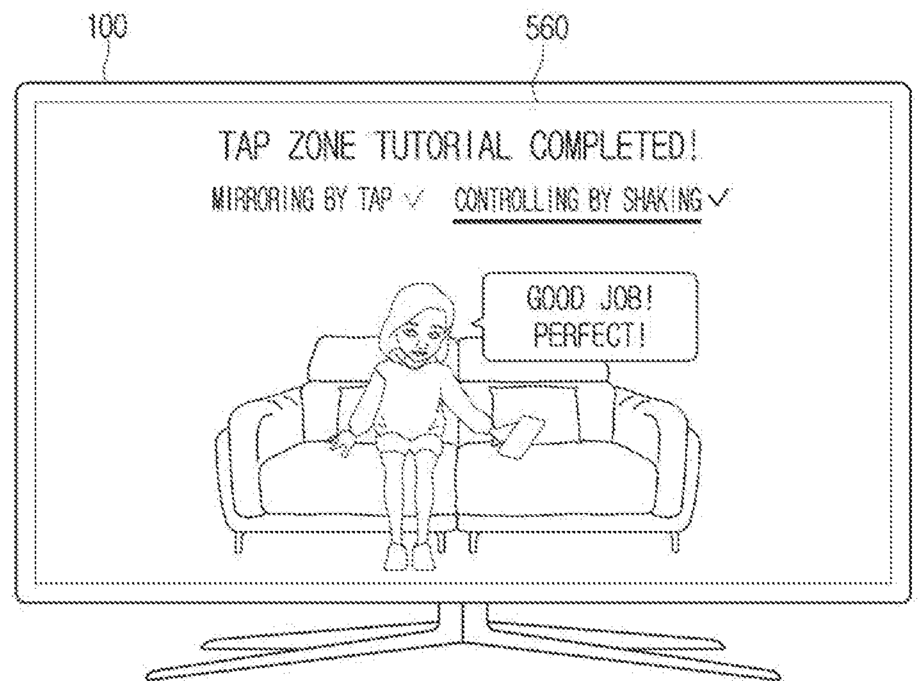

According to FIG. 5E, when a signal corresponding to a shake input is received from the user terminal 200, the processor 150 may transmit a control signal for executing a control command corresponding to the shake input to the user terminal 200 through the communication interface 130, and control the display 110 to provide a UI screen (560) showing that the tutorial has been completed.

Figure 6A:
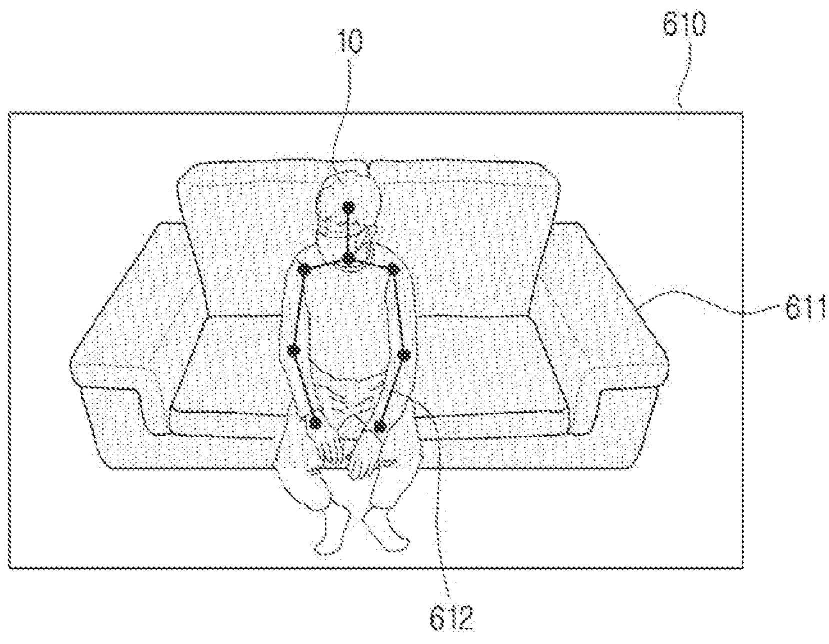
FIGS. 6A and 6B are diagrams illustrating a method of identifying whether a user is located within a preset zone, according to an embodiment of the disclosure.
Figure 6B:
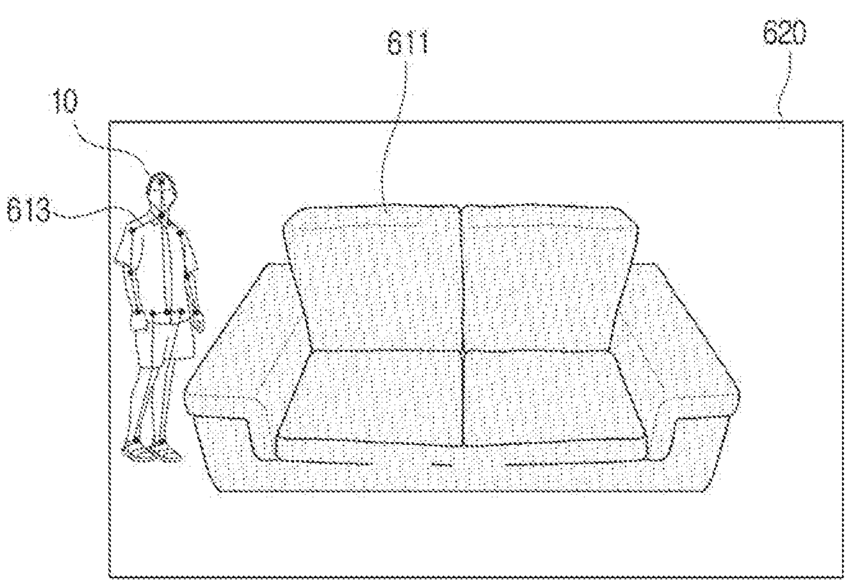

FIGS. 6A and 6B are diagrams illustrating a method of identifying whether a user is located within a preset zone according to an embodiment of the disclosure.

According to an embodiment, the processor 150 may obtain a skeleton 613 corresponding to the user 10 through the obtained image. This has been described through FIG. 5A and a detailed description will be omitted.

According to an embodiment, the processor 150 may identify whether the identified user is located within a preset zone on the basis of information on a preset zone and skeleton corresponding to the user. As shown in FIG. 6A, when it is identified that a skeleton 613 corresponding to a user 10 identified in a pixel region 611 corresponding to a predetermined component is included, the processor 150 may identify that the identified user 10 is located within a preset zone 611.

According to another embodiment, even when it is identified that a skeleton corresponding to a user 10 identified in a pixel region corresponding to a preset zone is included in a preset ratio or more, it is possible to identify that the identified user 10 is located within a preset zone. For example, it may be assumed that a preset ratio is 80%. For example, when it is identified that 90% of a pixel area corresponding to a skeleton of a user 10 is included in a pixel area corresponding to a preset zone, the processor 150 may identify that the identified user 10 is located in the preset zone. However, embodiments are not limited thereto, and the size of a preset ratio may be different.

According to another embodiment, the processor 150 may identify that the identified user 10 is not located in the preset zone if the ratio including the skeleton corresponding to the identified user 10 in the pixel area corresponding to the preset zone is less than a predetermined ratio. As shown in FIG. 6B, when the skeleton 613 corresponding to the user 10 is outside the preset zone 611 according to an embodiment, the processor 150 may identify that the user 10 is outside the zone by identifying that the ratio including the skeleton corresponding to the user 10 in the preset zone 611 is 0%. Even if a signal corresponding to a user interaction is received, the processor 150 may not execute an operation corresponding thereto, and may reduce misrecognition and malfunction of the electronic apparatus 100.

According to an embodiment, the processor 150 may identify whether the identified user is located within a preset zone for a threshold time or longer, and identify that the user is located within a preset zone only when it is identified that the identified user is located above or equal to a threshold time. According to an embodiment, when it is identified that a skeleton corresponding to a user is included in a pixel area corresponding to a preset zone by five seconds or more, which is a preset time, the processor 150 may identify that the identified user is located within a preset zone. However, the size of a preset time is not limited thereto.

According to an embodiment, an image for obtaining a preset zone and an image for identifying whether the user is located within a preset zone may be different images. For example, when a specific object is identified in a first image acquired through the camera 120, the processor 150 may identify a preset zone on the basis of the identified specific object and store the identified zone in the memory 140, and when the user is identified in the second image acquired through the camera 120, identify whether the identified user is located within a preset zone on the basis of the information about the preset zone stored in the memory 140.

Figure 7:
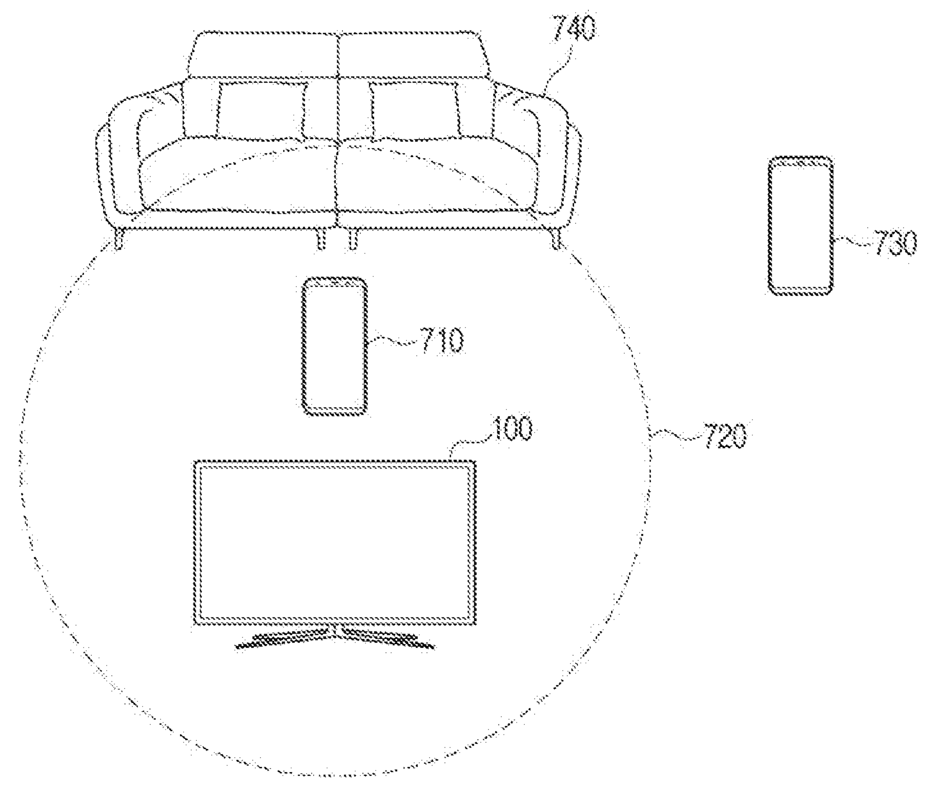
FIG. 7 is a diagram illustrating a method of identifying whether a user is located within a preset zone, according to an embodiment of the disclosure.

FIG. 7 is a diagram illustrating a method of identifying whether a user is located within a preset zone according to an embodiment of the disclosure.

According to an embodiment, it may be assumed that there is no information on a preset zone. Referring to FIG. 7, when a user input for identifying a preset zone 720 is identified, the processor 150 may identify reference RSSI size information from the user terminal 200. For example, if the reference size information is identified as 50, it may be stored in the memory 140.

The processor 150 may identify RSSI size information of a signal periodically received from the user terminal 200. For example, when the RSSI size information is identified as 30, the processor 150 may identify that the user terminal 710 is located within a preset zone 720 as the RSSI size information is identified as being 50 or less, which is the reference size information. When it is identified that the user terminal 730 is located within a preset zone, the processor 150 may identify that the user 10 is located within a preset zone. When the identified size information is identified as 70, the processor 150 may identify that the user terminal 730 is located outside the preset zone 720 as the RSSI size information is identified as being greater than 50, which is the reference size information.

Figure 8:
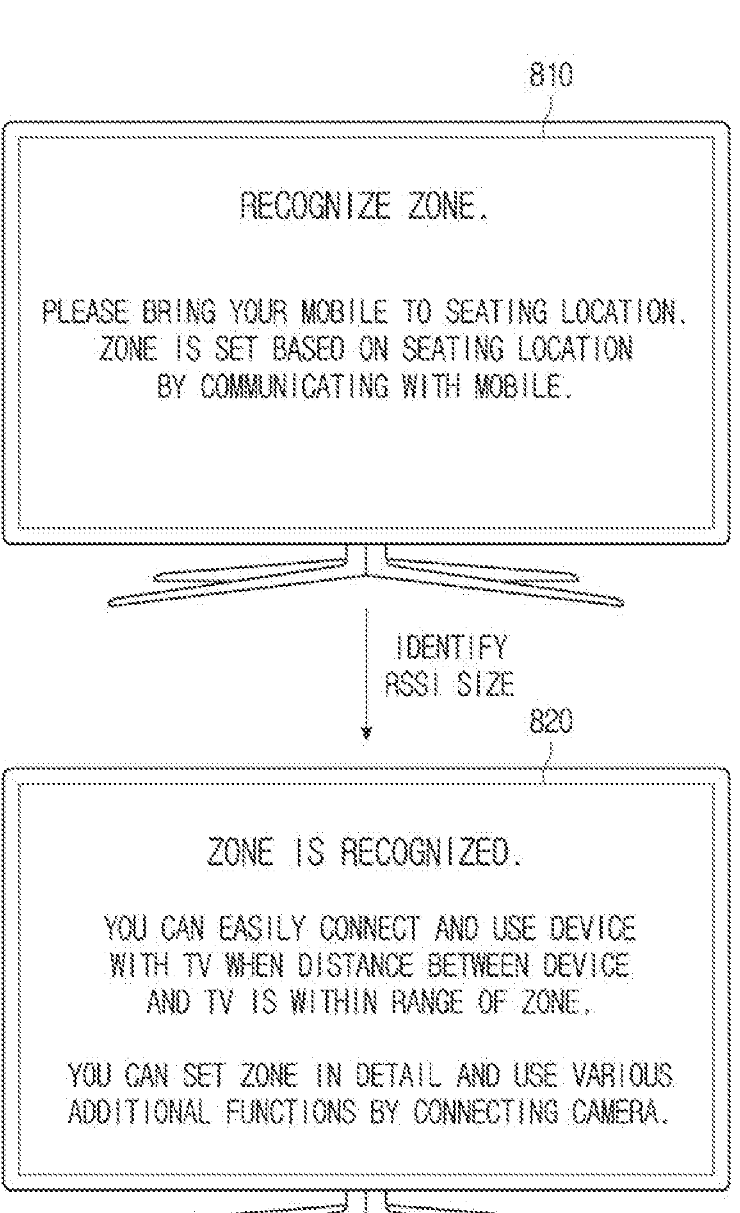
FIG. 8 is a diagram illustrating a UI screen for identifying received signal strength indication (RSSI) size information, according to an embodiment of the disclosure.

FIG. 8 is a diagram illustrating a UI screen for identifying received signal strength indication (RSSI) size information according to an embodiment of the disclosure.

According to an embodiment, it may be assumed that there is no information on a preset zone. Referring to FIG. 8, when a user input for identifying a preset zone is identified, the processor 150 may control the display 110 to display a UI screen 810 for identifying reference RSSI size information.

Then, when RSSI size information is received from the user terminal 200, the processor 150 may identify the received RSSI size information as reference size information. When the reference size information is identified, the processor 150 may control the display 110 to display a UI screen 820 indicating that a preset zone has been identified, based on the reference size information.

Figure 9:
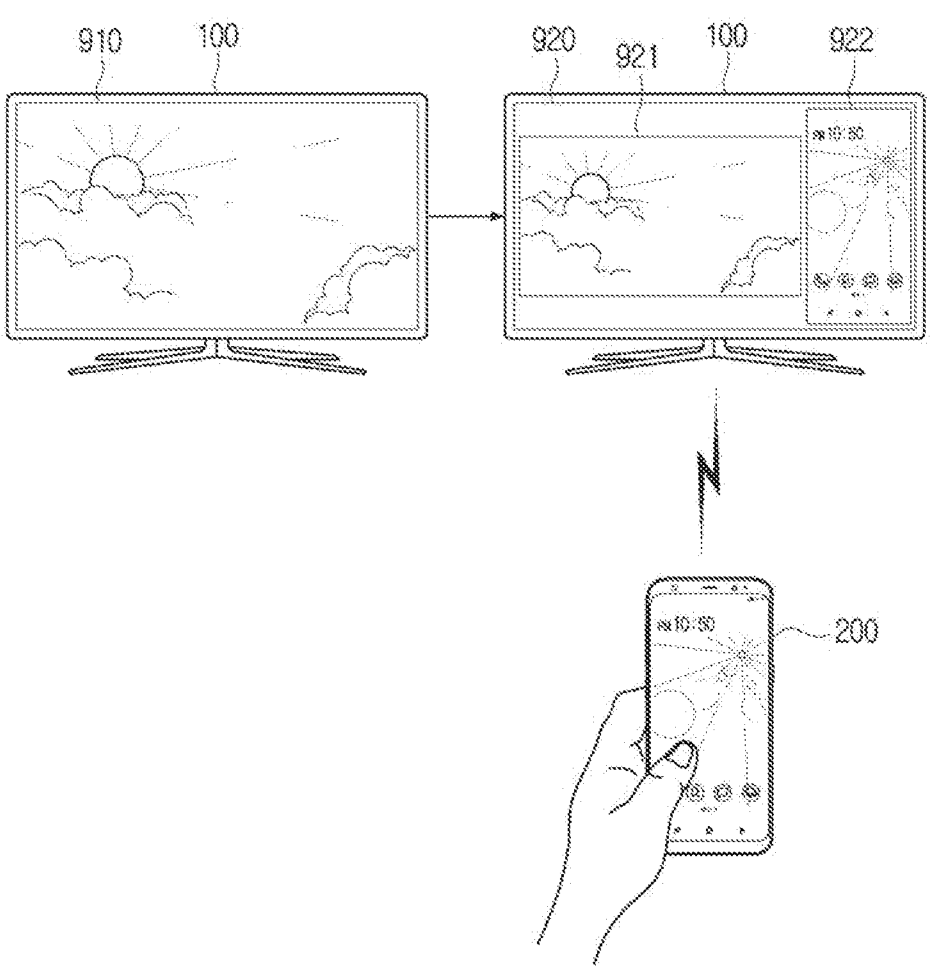
FIG. 9 is a diagram illustrating a method of displaying a UI screen corresponding to a type of a user interaction, according to an embodiment of the disclosure.

FIG. 9 is a diagram illustrating a method of displaying a UI screen corresponding to a type of a user interaction according to an embodiment of the disclosure.

According to FIG. 9, when the user is identified as being located in a preset zone according to an embodiment, the processor 150, if a signal corresponding to a tap input is received from the user terminal 200 through the communication interface 130, the processor 150 may control the display 110 to display a UI screen corresponding to the tap input.

According to an embodiment, it may be assumed that a signal corresponding to a tap input is received from the user terminal 200 through the communication interface 130 while the image 910 is displayed through the display 110. In this case, the processor 150 may control the display 110 to display a UI screen 920 including an image 921 displayed through the existing display 110 and an image 922 displayed through a display of the user terminal 200, respectively.

Figure 10A:
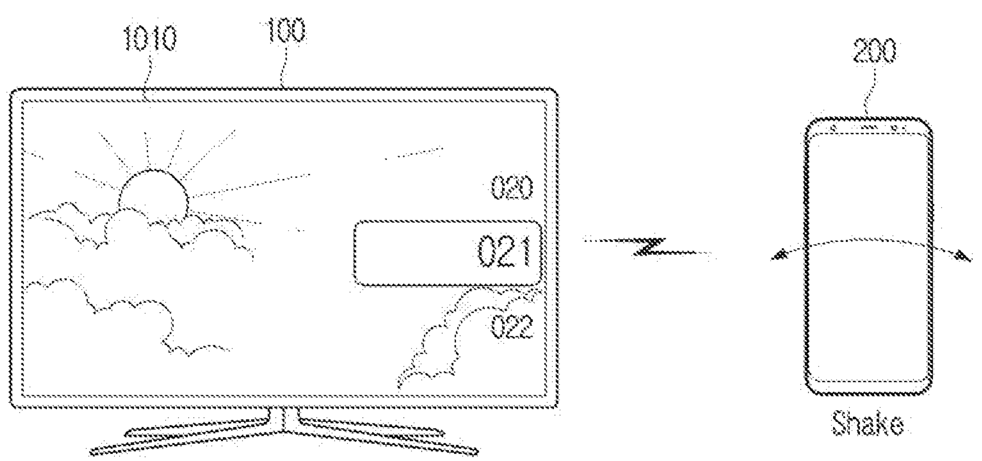
FIGS. 10A and 10B are diagrams illustrating a method of displaying a UI screen corresponding to a type of a user interaction, according to an embodiment of the disclosure.
Figure 10B:
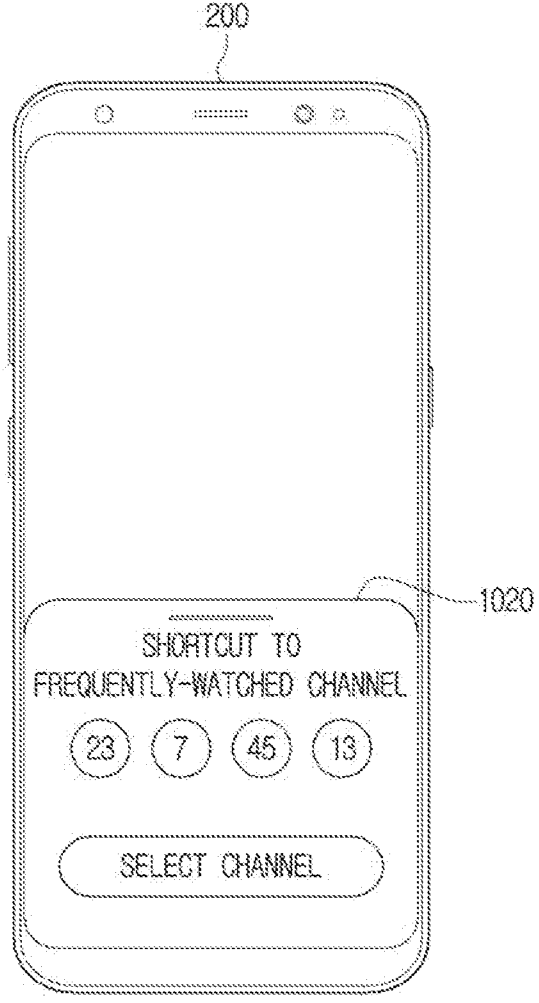

FIGS. 10A to 10B are diagrams illustrating a method of displaying a UI screen corresponding to a type of a user interaction according to an embodiment of the disclosure.

As shown in FIG. 10A, it may be assumed that the UI screen 1010 displayed on the display 110 is a UI screen for moving a channel. If a signal corresponding to the shake interaction is received from the user terminal 200 while being displayed on the above-described UI screen, the processor 150 may identify that the control command corresponding to the shake interaction is a command for controlling a UI screen provided from the user terminal 200.

According to an embodiment, the processor 150 may transmit a control signal for providing, from the user terminal 200 to the user terminal 200 through the communication interface 130, a UI screen 1020 recommending channels frequently used by the user, as shown in FIG. 10B. Accordingly, the user may easily change the channel of the electronic apparatus 100 through the user terminal 200.

However, it is not limited thereto, and when a signal corresponding to a tap interaction rather than a shake interaction is received according to the initial setting, a UI screen corresponding to the content displayed on the display 110 *e* control signal may be transmitted to the user terminal 200 through the communication interface 130.

Figure 11:
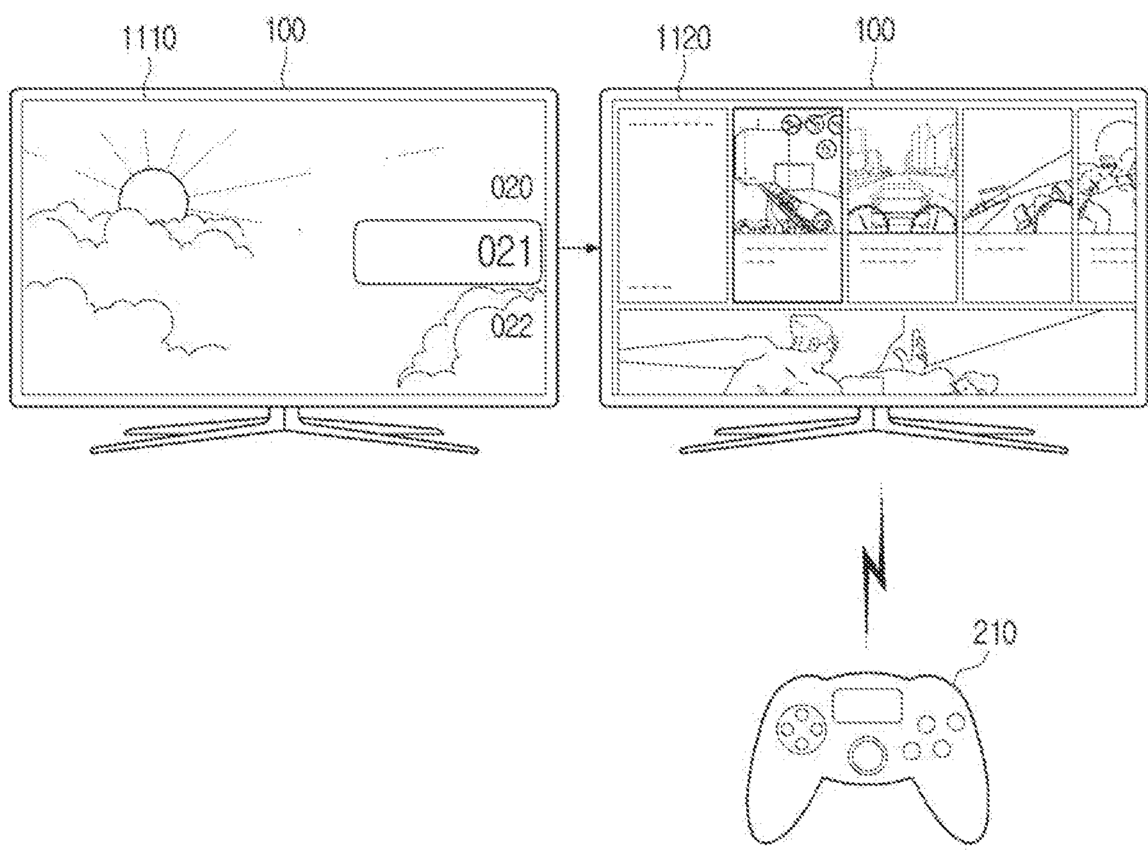
FIG. 11 is a diagram illustrating a method of displaying a UI screen corresponding to a type of a user interaction, according to an embodiment of the disclosure.

FIG. 11 is a diagram illustrating a method of displaying a UI screen corresponding to a type of a user interaction according to an embodiment of the disclosure.

According to an embodiment, when a user is identified as being located in a preset zone and while an image 1110 is displayed through the display 110, a signal corresponding to the tap input is received from the user terminal 200 through the communication interface 130. Here, the user terminal 200 may be a game console. According to FIG. 11, the processor 150 may control the display 110 to display a UI screen 1120 corresponding to a console game selection instead of the image 1110 displayed through the conventional display 110 as a signal corresponding to a tap input is received. However, in this case, a signal corresponding to the tap input may be received together with type information of the user terminal 210. Alternatively, when a tap input is received, the processor 150 may identify an external input (e.g., when a game player is connected) to identify that the user terminal 210 is a game console and perform a corresponding function. Accordingly, the user may play the game by simply connecting the user terminal 210 and the electronic apparatus 100 with only tap interaction.

Figure 12A:
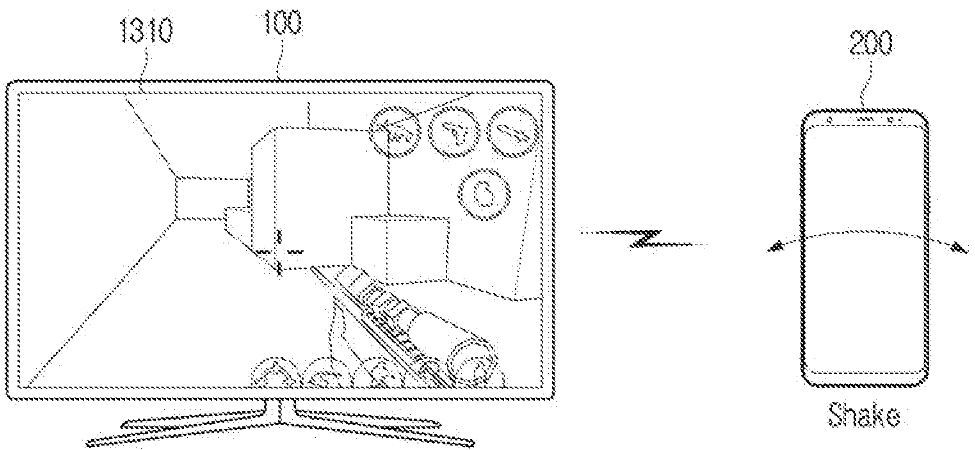
FIGS. 12A and 12B are diagrams illustrating a method of displaying a UI screen corresponding to a type of a user interaction, according to an embodiment of the disclosure.
Figure 12B:
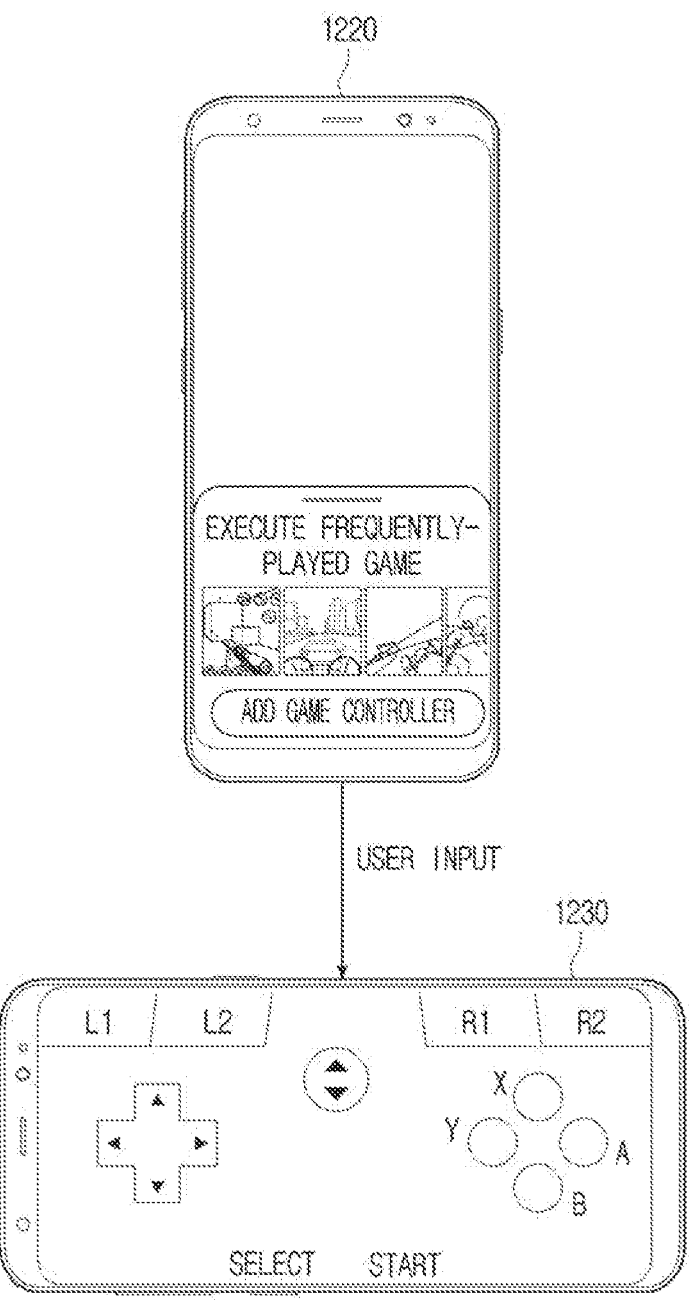

FIGS. 12A and 12B are diagrams illustrating a method of displaying a UI screen corresponding to a type of a user interaction according to an embodiment of the disclosure.

According to an embodiment, when the user is identified as being located in a preset zone and as shown in FIG. 12A, the UI screen 1210 displayed on the display 110 may be a UI screen for the user to play a game. If a signal corresponding to the shake interaction is received from the user terminal 200 while being displayed on the above-described UI screen, the processor 150 may identify that the control command corresponding to the shake interaction is a command to control the UI screen provided from the user terminal 200.

According to an embodiment, the processor 150 may recommend a frequently played game to the user as shown in FIG. 12B, and may transmit a control signal for providing a UI screen 1220 by the user terminal 200 to connect the user terminal 200 and the electronic apparatus 100 to the user terminal 200 through the communication interface 130. When a user input is input through the UI screen 1221 for connecting the user terminal 200 and the electronic apparatus 100, the processor 150 may transmit a control signal to provide the UI screen 1230 corresponding to the game controller by the user terminal 200 to the user terminal 200 through the communication interface 130.

The user may conveniently connect the user terminal 200 and the electronic apparatus 100 with only user interaction without a separate user input.

Figure 13A:
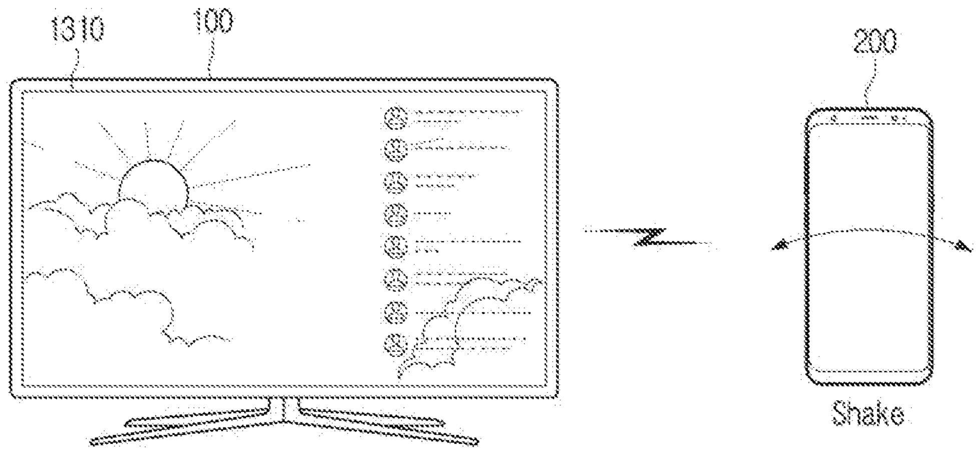
FIGS. 13A and 13B are diagrams illustrating a method of displaying a UI screen according to a type of a user interaction, according to an embodiment of the disclosure.
Figure 13B:
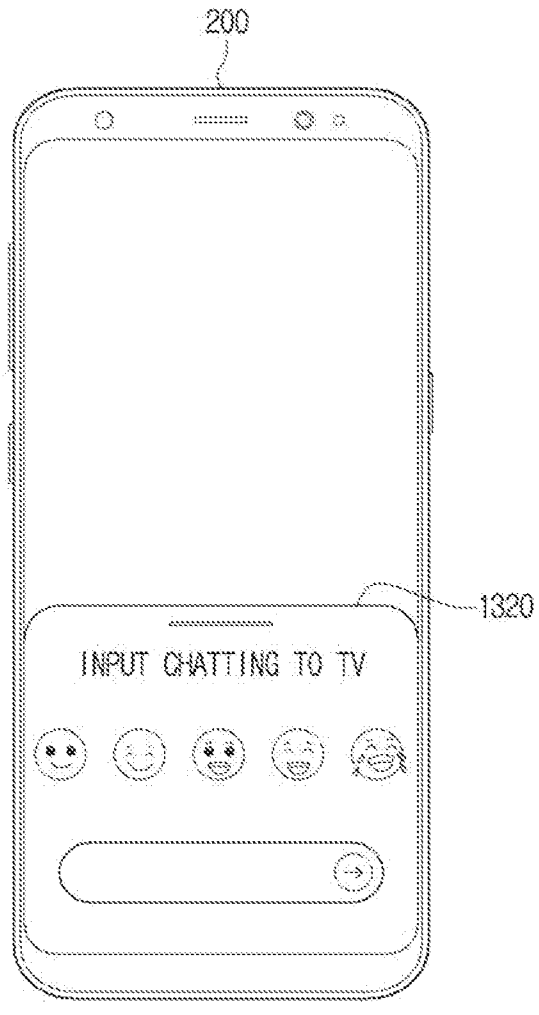

FIGS. 13A and 13B are diagrams illustrating a method of displaying a UI screen according to a type of a user interaction according to an embodiment of the disclosure.

According to an embodiment, when the user is identified as being located in a preset zone and as shown in FIG. 13A, the UI screen 1310 displayed on the display 110 may be a UI screen for the user to chat online. If a signal corresponding to the shake interaction is received from the user terminal 200 while the UI screen 1310 is displayed, the processor 150 may identify that the control command corresponding to the shake interaction is the command for controlling the UI screen provided by the user terminal 200.

According to an embodiment, the processor 150 may transmit a control signal to provide a UI screen 1320 for the user to input a chat through the user terminal 200 by the user terminal 200, as shown in FIG. 13B to the user terminal through the communication interface 130.

Figure 14:
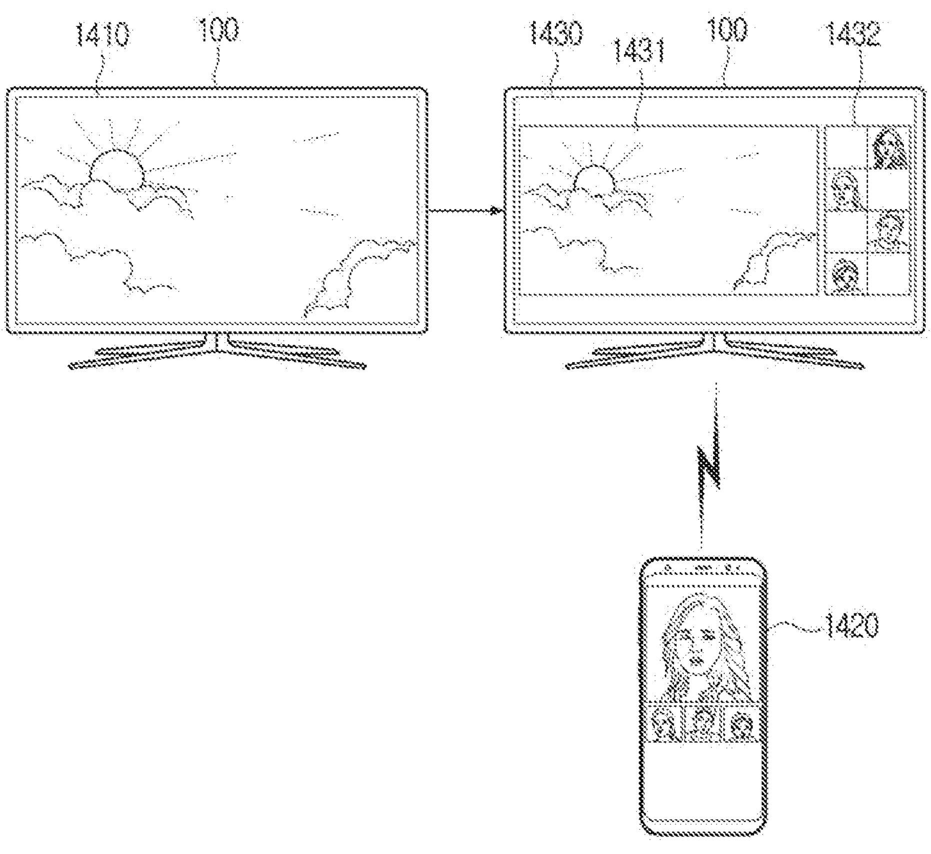
FIG. 14 is a diagram illustrating a method of displaying a UI screen corresponding to a type of a user interaction, according to an embodiment of the disclosure.

FIG. 14 is a diagram illustrating a method of displaying a UI screen corresponding to a type of a user interaction according to an embodiment of the disclosure.

According to an embodiment, when a user is identified as being located in a preset zone and while an image 1410 is displayed through the display 110, a signal corresponding to the tap input is received from the user terminal 200 through the communication interface 130. According to FIG. 14, the processor 150 may control the display 110 to display a UI screen 1430 including an image 1432 obtained based on an image display through the display of the user terminal 200 along with the image 1431 displayed through the former display 110 as a signal corresponding to the tap input is received.

In this case, the image 1420 displayed through the display of the user terminal 200 and the image 1432 in the UI screen may be different. For example, if the processor 150 identifies that the image 1420 displayed through the display of the user terminal 200 corresponds to a video call, the processor 150 may control the display 110 to display a UI screen 1430 including an image 1432 changed so that the sizes of the image of all people participating in the vide call are the same.

Figure 15:
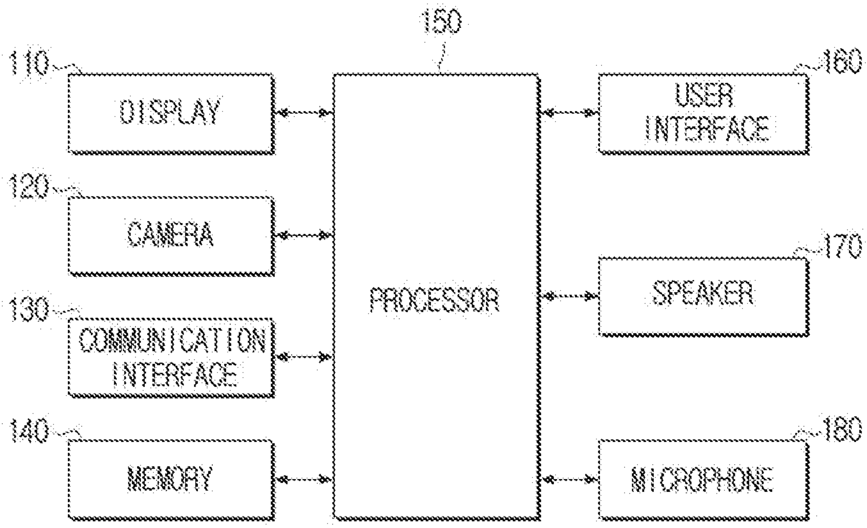
FIG. 15 is a diagram illustrating a detailed configuration of an electronic apparatus, according to an embodiment of the disclosure.

FIG. 15 is a diagram illustrating a detailed configuration of an electronic apparatus according to an embodiment of the disclosure.

According to FIG. 15, an electronic apparatus 100' may include the display 110, the camera 120, the communication interface 130, the memory 140, the processor 150, a user interface 160, a speaker 170, and a microphone 180. Among the components shown in FIG. 15, detailed descriptions of components overlapping those shown in FIG. 2 will be omitted.

The user interface 160 is configured to be involved in performing interaction with the user by the electronic apparatus 100'. For example, the user interface 160 may include at least one of a touch sensor, a motion sensor, a button, a jog dial, a switch, a microphone, or a speaker, but is not limited thereto.

The speaker 170 may include a tweeter for playing a high-pitched sound band sound, a mid-range for playing a middle-range sound band sound, a woofer for playing a low-pitched sound band sound, a subwoofer for playing a very low-pitched sound band sound, an enclosure for controlling resonance, a crossover network for dividing an electric signal frequency inputted to the speaker for each band, and the like.

The speaker 170 may output the sound signal to the outside of the electronic apparatus 100'. The speaker 170 may output multimedia playback, recording playback, various notification sounds, voice messages, and the like. The electronic apparatus 100' may include an audio output device such as the speaker 170, but may include an output device such as an audio output terminal. The speaker 170 may provide obtained information, information processed/produced based on the obtained information, a response result of a user voice, or an operation result in a voice form.

The microphone 180 may refer to a module for obtaining a sound and converting the sound into an electrical signal, and may be a condenser microphone, a ribbon microphone, a moving coil microphone, a piezoelectric element microphone, a carbon microphone, and a Micro Electro Mechanical System (MEMS) microphone. The microphone may be implemented in the manner of omnidirectional, bi-directional, unidirectional, sub-cardioid, super cardioid, hyper cardioid, or the like.

Figure 16:
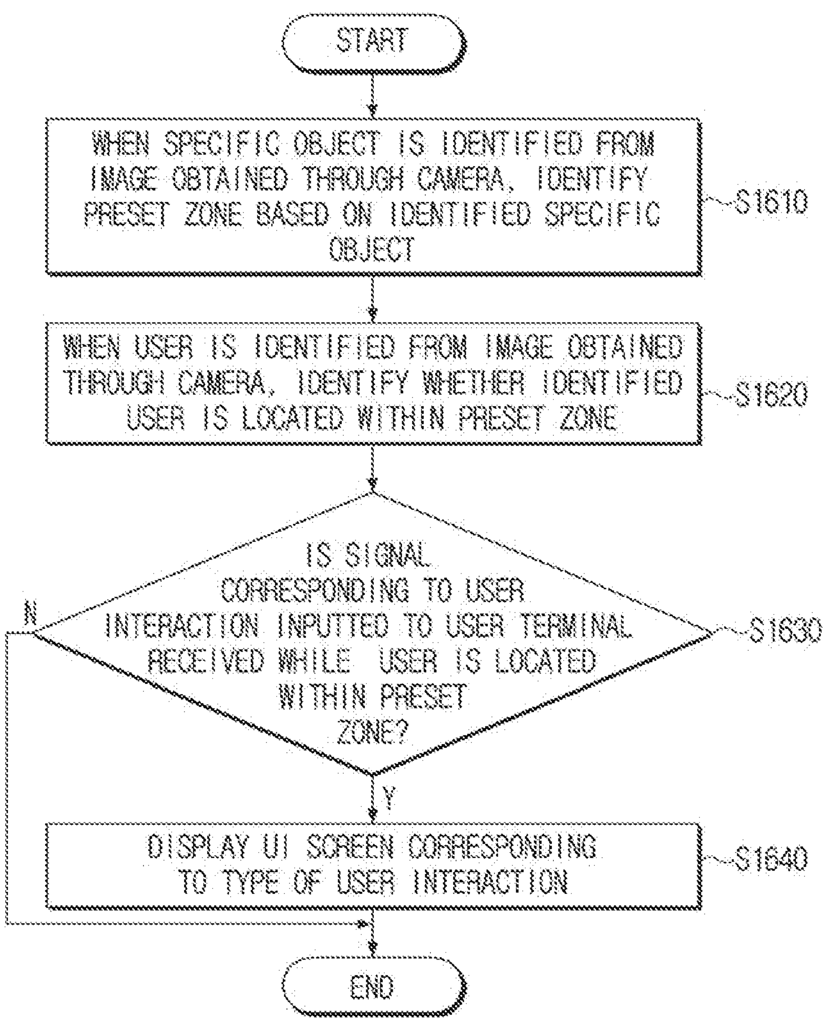
FIG. 16 is a flowchart illustrating a control method of an electronic apparatus, according to an embodiment of the disclosure.

FIG. 16 is a flowchart illustrating a control method of an electronic apparatus according to an embodiment of the disclosure.

According to the control method of the electronic apparatus shown in FIG. 16, when a specific object is first identified in an image obtained through a camera, a preset zone is identified based on the identified specific object in operation S1610.

Here, operation S1610 may include the steps of displaying an image including a specific object, displaying a UI screen for setting a preset zone in the displayed image, and identifying a preset zone based on the user command input through the displayed UI screen.

In operation S1610, when it is identified that the identified user is located in a preset zone for a threshold time or longer, it may be identified that a user is located within a preset zone.

Here, operation S1610 may include the steps of displaying an image including a plurality of specific objects displaying a UI screen for setting a preset zone corresponding to each of a plurality of specific objects in the displayed image, and identifying a preset zone corresponding to each of the plurality of specific objects based on the user command inputted through the displayed UI screen.

When a user is identified from the image obtained through the camera, it is identified whether the identified user is located within a preset zone in operation S1620.

In operation S1620, it may be identified whether the user terminal is located within a preset zone based on the RSSI size information of a signal periodically received from the user terminal, and it may be identified that the user is located within a preset zone when it is identified that the user terminal is located within the preset zone.

Then, it is identified whether a signal corresponding to a user interaction inputted to the user terminal is received while the user is located within the preset zone in operation S1630.

In operation S1630, when a signal corresponding to the user interaction is received, a UI screen corresponding to the type of the user interaction is displayed in operation S1640. The UI screen corresponding to a type of the user interaction may be a UI screen for providing multi device experience (MDE).

Here, the control method may further include the steps of: storing information on a plurality of preset zones mapped to face information of a plurality of users in a memory; obtaining information on a plurality of preset zones mapped to face information of a first user among face information of the plurality of users when face information of the first user is identified in the image obtained through the camera; and identifying whether the face information of the first user is located within a plurality of preset zones.

Here, the control method may further include identifying a control command corresponding to the type of user interaction and, when the identified control command is a command for controlling a UI screen provided from a user terminal, transmitting a UI corresponding to the content displayed on the display to the user terminal to provide the UI screen on the user terminal.

In operation S1640, a UI screen indicating a region identified based on each of a plurality of specific objects is displayed, and in operation S1610, at least one region selected based on a user command among regions identified based on each of a plurality of specific objects as a preset zone.

In operation S1610, when a specific object is identified in the first image obtained through the camera, a preset zone is identified based on the identified specific object, and information on the identified preset zone is transmitted. In operation S1620, when the user is identified in the second image obtained through the camera, it is possible to identify whether the identified user is located in the preset zone based on information about the preset zone stored in the memory.

Figure 17:
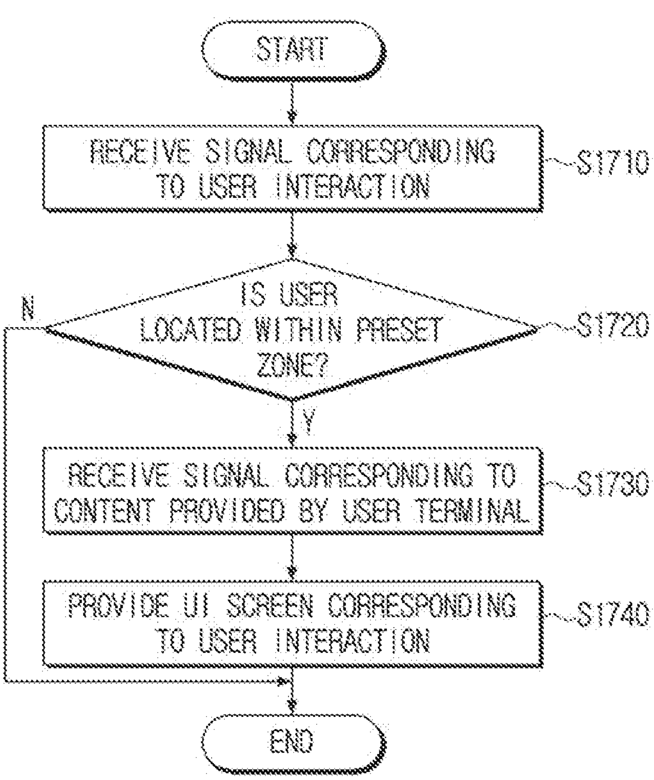
FIG. 17 is a flowchart to describe a control method of an electronic apparatus, according to an embodiment of the disclosure.

FIG. 17 is a flowchart to describe a control method of an electronic apparatus according to an embodiment of the disclosure.

First, according to an embodiment, the processor 150 receives a signal corresponding to a user interaction from the user terminal 200 in operation S1710. In this case, the type of user interaction may be at least one of a tap interaction and a shake interaction.

According to an embodiment, the processor 150 identifies whether the user 10 is located within a preset zone in operation S1720. According to an embodiment, the processor 150 may identify whether the user 10 is located within a preset zone based on whether the skeleton corresponding to the user 10 is included in a preset zone by obtaining information about a preset zone through the memory 140 and identifying whether the user 10 is present through the image obtained through the camera 120 and location of skeleton corresponding to the user 10.

When it is identified that the user 10 is located within a preset zone, the processor 150 may receive a signal corresponding to the content provided by the user terminal 200 according to an embodiment in operation S1730.

According to an embodiment, the processor 150 may provide a UI screen corresponding to the user interaction in operation S1740. For example, when a signal corresponding to a tap input is received, the processor 150 may control the display 110 to provide a UI screen including a screen displayed through the display 110 and a UI screen for mirroring the user terminal 200, respectively.

Figure 18:
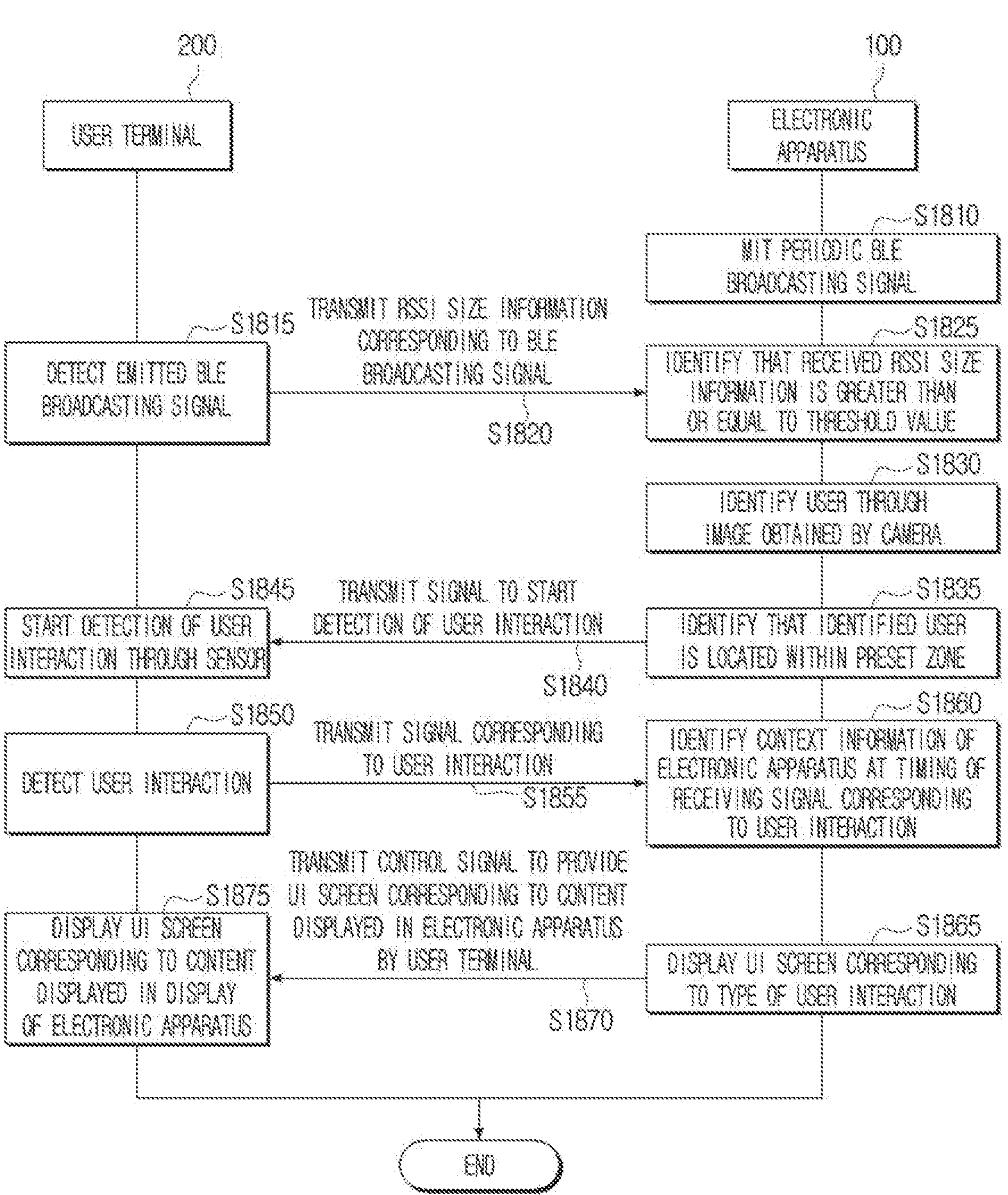
FIG. 18 is a diagram illustrating a method of providing a UI screen to a user, according to an embodiment of the disclosure.

FIG. 18 is a diagram illustrating a method of providing a UI screen to a user according to an embodiment of the disclosure.

According to an embodiment, the electronic apparatus 100 may identify whether the user is located within a preset zone by considering both the BLE broadcasting signal and the image obtained through the camera.

For example, as shown in FIG. 18, the electronic apparatus 100 periodically emits a BLE broadcasting signal in operation S1810. Here, the signal emission period may be a preset value (e.g., 3 seconds or 5 seconds), but is not limited thereto. In this case, when the user terminal 200 receives the BLE broadcasting signal emitted from the electronic apparatus 100 in operation S1815, the user terminal 200 transmits RSSI size information corresponding to the received BLE broadcasting signal to the electronic apparatus 100 in operation S1820.

When the received RSSI size information is identified as greater than or equal to the threshold value in operation S1825, the electronic apparatus 100 identifies the user based on the image obtained through the camera 120 in operation S1830. Here, the size information of the threshold value may be pre-stored in the memory 140 at the time of initial setting, but is not limited thereto, and may be changed based on user input.

Thereafter, when the identified user is identified as being located within a preset zone in operation S1835, the electronic apparatus 100 transmits a signal for starting detection of user interaction to the user terminal 200 in operation S1840, and the user terminal 200 starts sensing the user interaction accordingly in operation S1845.

When a user interaction is detected in operation S1850, the user terminal 200 transmits a signal corresponding to the detected user interaction to the electronic apparatus 100 in operation S1855. When the signal corresponding to the user interaction is received from the user terminal 200, the electronic apparatus 100 identifies context information of the electronic apparatus 100 at the time the signal is received in operation S1860. Here, the context information is information about the content displayed on the electronic apparatus 100, and may include, for example, the type of content, the content provider, whether or not subtitles are provided for the content, and the like.

The electronic apparatus 100 displays a UI screen corresponding to the type of user interaction in operation S1865, and transmits a control signal to provide a UI screen corresponding to the content displayed on the electronic apparatus 100 to the user terminal 200 in operation S1870. For example, when a tap interaction is received, the electronic apparatus 100 displays a UI screen on which an online chatting application is executed, and transmits a control signal to provide a UI screen for inputting a chat to the user terminal 200 from the user terminal 200.

When a control signal is received from the electronic apparatus 100, the user terminal 200 displays a UI screen corresponding to the displayed content of the electronic apparatus 100 in operation S1875. For example, when the UI screen displayed on the electronic apparatus 100 is a UI screen for a user to chat online, the user terminal 200 receives a control signal to provide a UI screen for inputting a chat on the user terminal 200 from the electronic apparatus 100 and may display a UI screen to input chatting.

Figure 19:
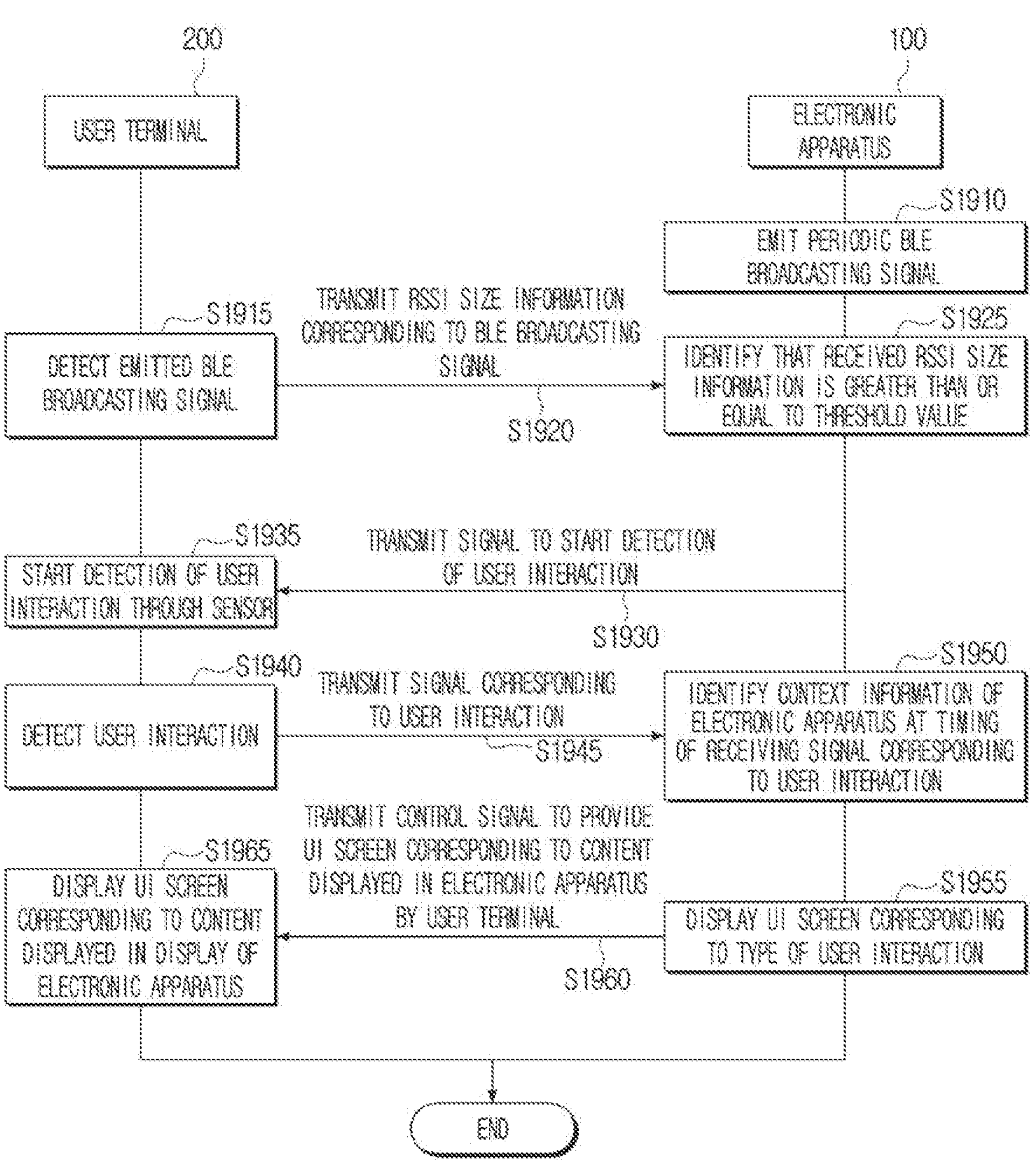
FIG. 19 is a diagram illustrating a method of providing a UI screen to a user, according to an embodiment of the disclosure.

FIG. 19 is a diagram illustrating a method of providing a UI screen to a user according to an embodiment of the disclosure.

According to an embodiment, the electronic apparatus 100 may identify whether a user is located within a preset zone in consideration of only the BLE broadcasting signal.

For example, as shown in FIG. 19, the electronic apparatus 100 periodically emits a BLE broadcasting signal in operation S1910. Then, when the user terminal 200 receives the BLE broadcasting signal emitted from the electronic apparatus 100 in operation S1915, the user terminal 200 transmits RSSI size information corresponding to the received BLE broadcasting signal to the electronic apparatus 100 in operation S1920.

Thereafter, when the received RSSI size information is identified as being greater than or equal to the threshold value in operation S1925, the electronic apparatus 100 transmits a signal for starting detection of user interaction to the user terminal 200 in operation S1930, and the user terminal 200 accordingly starts sensing the user interaction in operation S1935.

Thereafter, when a user interaction is detected in operation S1940, the user terminal 200 transmits a signal corresponding to the detected user interaction to the electronic apparatus 100 in operation S1945. When a signal corresponding to the detected user interaction is received from the user terminal 200 in operation S1945, the electronic apparatus 100 identifies context information of the electronic apparatus 100 at the time when the signal corresponding to the user interaction is received in operation S1950.

Thereafter, the electronic apparatus 100 displays a UI screen corresponding to the type of user interaction in operation S1955, and provides a control signal to provide a UI screen corresponding to the content displayed on the electronic apparatus 100 in the user terminal 200 to the user terminal 200 in operation S1960. When a control signal is received from the electronic apparatus 100, the user terminal 200 displays a UI screen corresponding to the content displayed on the electronic apparatus 100 in operation S1965.

According to various embodiments described above, a zone may be set in consideration of an image obtained through a camera, and an electronic apparatus and an external device may be connected in consideration of information about the set zone and the location of the identified user. Accordingly, it is possible to communicate with the external device efficiently, and the occurrence of misrecognition and malfunction occurring during communication with the external device may be reduced.

The methods according to various embodiments described above may be implemented in the form of an application that may be installed in an existing electronic apparatus. Alternatively, the above-described methods according to various embodiments may be performed using a deep learning-based artificial neural network (or deep artificial neural network), that is, a learning network model. The methods according to various embodiments described above may be implemented by software upgrade or hardware upgrade for an existing electronic apparatus. In addition, various embodiments described above may be performed through an embedded server provided in the electronic apparatus or an external server of the electronic apparatus.

According to an embodiment, the various embodiments described above may be implemented as software including instructions stored in a machine-readable storage media which is readable by a machine (e.g., a computer). The device may include a display device (e.g., display device A) according to the disclosed embodiments, as a device which calls the stored instructions from the storage media and which is operable according to the called instructions. When the instructions are executed by a processor, the processor may perform functions corresponding to the instructions using other components or the functions may be performed under a control of the processor. The instructions may include code generated by a compiler or a code executed by an interpreter. The machine-readable storage media may be provided in a form of a non-transitory storage media. The 'non-transitory' storage media may not include a signal and is tangible, but does not distinguish whether data is stored semi-permanently or temporarily in the storage media.

According to an embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

Further, each of the components (e.g., modules or programs) according to the various embodiments described above may be include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

While the disclosure has been illustrated and described with reference to various example embodiments, it will be understood that the various example embodiments are intended to be illustrative, not limiting. In other words, the disclosure is not limited to the specific embodiments described above. It will be further understood by those skilled in the art that various changes in form and detail may be made without departing from the true spirit and full scope of the disclosure, including the appended claims and their equivalents.

What is claimed is:

1. An electronic apparatus comprising:
a display;
a camera;
a communication interface;
a memory configured to store information; and
one or more processors configured to:
based on a specific object being identified from a captured image obtained through the camera, identify a preset zone with respect to the specific object,
based on a user being identified from the captured image, identify whether the user is located within the preset zone,
based on the user being located in the preset zone, control the display to display a guide user interface (UI) corresponding to an input of a user interaction,
based on a signal corresponding to a user interaction being received by the communication interface and identifying that the user is located in the preset zone, control the display to display a UI screen corresponding to a type of the user interaction; and
based on the signal corresponding to a tap input on a user terminal, control the display of the electronic apparatus to display a user terminal image being displayed on the user terminal.

2. The electronic apparatus of claim 1, wherein the one or more processors is further configured to:
control the display to display an image including the specific object,
control the display to display a UI screen to set a preset zone on the displayed image including the specific object, and
identify the preset zone based on a user command input through the UI screen.

3. The electronic apparatus of claim 1, wherein the one or more processors is further configured to, based on identifying that the user is located in the preset zone for a predetermined amount of time, identify that the user is located in the preset zone.

4. The electronic apparatus of claim 1, wherein the one or more processors is further configured to:
control the display to display an image including a plurality of specific objects,
control the display to display a UI screen to set preset zones corresponding to the plurality of specific objects from the displayed image including the specific object, and
identify the preset zones corresponding to the plurality of specific objects based on a user command input through the UI screen.

5. The electronic apparatus of claim 4, wherein the one or more processors is further configured to:
control the display to display a UI screen representing a region based on each of the plurality of specific objects, and
identify at least one region that is selected based on a user command, from among regions identified based on each of the plurality of specific objects, as the preset zone.

6. The electronic apparatus of claim 4, wherein the one or more processors is further configured to:

store, in the memory, information about a plurality of preset zones mapped to face information of a plurality of users, based on the face information of a first user being identified from the captured image obtained through the camera, obtain information about the plurality of preset zones mapped to the face information of the first user among the face information of the plurality of users, and identify whether the first user is located in the plurality of preset zones mapped to the face information of the first user.

7. The electronic apparatus of claim 1, wherein the one or more processors is further configured to:

identify a control command corresponding to the type of the user interaction, and based on the control command being a command to control a UI screen provided by the user terminal, transmit, to the user terminal through the communication interface, a control signal to provide the UI screen corresponding to content displayed on the display in the user terminal.

8. The electronic apparatus of claim 1, wherein the one or more processors is further configured to:

identify whether the user terminal is located in the preset zone based on received signal strength indication (RSSI) size information of a signal that is received from the user terminal, and based on identifying that the user terminal is located in the preset zone, identify that the user is located within the preset zone.

9. The electronic apparatus of claim 1, wherein the one or more processors is further configured to:

based on the specific object being identified from a first image obtained through the camera, identify a preset zone with respect to the specific object, and store, in the memory, information about the preset zone, and based on the user being identified from a second image obtained through the camera, identify whether the user is located within the preset zone based on information about the preset zone stored in the memory.

10. The electronic apparatus of claim 1, wherein the UI screen corresponding to the type of the user interaction is the UI screen for providing a multi device experience.

11. A method for controlling an electronic apparatus, the method comprising:

based on a specific object being identified from a captured image obtained through a camera, identifying a preset zone with respect to the specific object;

based on a user being identified from the captured image, identifying whether the user is located within the preset zone;

based on the user being located in the preset zone, displaying a guide user interface (UI) corresponding to an input of a user interaction;

based on a signal corresponding to the user interaction being received by the electronic apparatus while the user is located in the preset zone, displaying a UI screen corresponding to a type of the user interaction; and based on the signal corresponding to a tap input on a user terminal, displaying on a display of the electronic apparatus a user terminal image being displayed on the user terminal.

12. The method of claim 11, wherein the identifying the preset zone comprises:

displaying an image including the specific object;

displaying a UI screen to set a preset zone on the displayed image including the specific object; and identifying the preset zone based on a user command input through the UI screen.

13. The method of claim 11, wherein the identifying the preset zone comprises, based on identifying that the user is located in the preset zone for a predetermined amount of time, identifying that the user is located in the preset zone.

14. The method of claim 11, wherein the identifying the preset zone comprises:

displaying an image including a plurality of specific objects;

displaying a UI screen to set preset zones corresponding to the plurality of specific objects from the displayed image including the plurality of specific objects; and identifying the preset zones corresponding to the plurality of specific objects based on a user command input through the UI screen.

15. The method of claim 14, wherein the displaying the UI screen comprises:

displaying a UI screen representing a region based on each of the plurality of specific objects, and wherein the identifying the preset zone corresponding to each of the plurality of specific objects comprises identifying at least one region that is selected based on a user command, from among regions identified based on each of the plurality of specific objects, as the preset zone.

16. An electronic apparatus comprising:

a memory configured to store information; and one or more processors configured to:

based on a specific object being identified from a captured image, identify a preset zone with respect to the specific object, based on a user being identified from the captured image, identify whether the user is located within the preset zone, based on the user being located in the preset zone, control to display a guide user interface (UI) corresponding to an input of a user interaction;

based on a signal corresponding to the user interaction being received while the user is located in the preset zone, control to display a UI screen corresponding to a type of the user interaction; and based on the signal corresponding to a tap input on a user terminal, control to display a user terminal image being displayed on the user terminal.

17. The electronic apparatus of claim 16, wherein the one or more processors is further configured to:

control to display an image including the specific object, control to display a UI screen to set a preset zone on the displayed image including the specific object, and identify the preset zone based on a user command input through the UI screen.

18. The electronic apparatus of claim 16, wherein the one or more processors is further configured to, based on identifying that the user is present in the preset zone for a predetermined amount of time, identify that the user is located in the preset zone.

19. The electronic apparatus of claim 16, wherein the one or more processors is further configured to:

control to display an image including a plurality of specific objects, control to display a UI screen to set preset zones, each preset zone corresponding to a respective specific object of the plurality of specific objects from the displayed image including the plurality of specific objects, and identify the preset zones corresponding to each of the plurality of specific objects based on a user command input through the UI screen.

20. The electronic apparatus of claim 19, wherein the one or more processors is further configured to:

control to display a UI screen representing a region based on each of the plurality of specific objects, and identify at least one region that is selected based on a user command, from among regions identified based on each of the plurality of specific objects, as the preset zone.

* * * * *